US008835567B2

United States Patent
Demirors et al.

(10) Patent No.: US 8,835,567 B2
(45) Date of Patent: *Sep. 16, 2014

(54) SEALANT COMPOSITION, METHOD OF PRODUCING THE SAME

(75) Inventors: Mehmet Demirors, Pearland, TX (US); Rongjuan Cong, Lake Jackson, TX (US); Cristina Serrat, Sugar Land, TX (US); Gagan Saini, Lake Jackson, TX (US); Michael Rutkowske, Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/393,601

(22) PCT Filed: Oct. 26, 2011

(86) PCT No.: PCT/US2011/057780
§ 371 (c)(1),
(2), (4) Date: Mar. 1, 2012

(87) PCT Pub. No.: WO2012/061168
PCT Pub. Date: May 10, 2012

(65) Prior Publication Data
US 2013/0210990 A1  Aug. 15, 2013

Related U.S. Application Data

(60) Provisional application No. 61/409,389, filed on Nov. 2, 2010.

(51) Int. Cl.
C08F 8/00 (2006.01)
C08L 23/06 (2006.01)
C08L 23/10 (2006.01)

(52) U.S. Cl.
USPC ........................................ 525/191; 525/240

(58) Field of Classification Search
USPC ................................................ 525/191, 240
See application file for complete search history.

(56) References Cited

U.S. PATENT DOCUMENTS

| | | | |
|---|---|---|---|
| 5,504,172 A | 4/1996 | Imuta et al. | |
| 6,525,157 B2 | 2/2003 | Cozewith et al. | |
| 6,960,635 B2 | 11/2005 | Stevens et al. | |
| 7,855,258 B2 | 12/2010 | Datta et al. | |
| 8,058,373 B2 | 11/2011 | Stevens et al. | |
| 8,299,189 B2 | 10/2012 | Boone et al. | |
| 8,372,931 B2 * | 2/2013 | Hermel-Davidock et al. ............... | 526/352 |
| 2004/0010103 A1 | 1/2004 | Boussie et al. | |
| 2010/0028523 A1 | 2/2010 | Asama et al. | |
| 2010/0285253 A1 | 11/2010 | Hughes et al. | |
| 2011/0015346 A1 | 1/2011 | Hermel-Davidock et al. | |
| 2011/0313119 A1 | 12/2011 | Konze et al. | |

FOREIGN PATENT DOCUMENTS

| | | |
|---|---|---|
| WO | WO-98/39385 A1 | 9/1998 |
| WO | 0078859 A1 | 12/2000 |
| WO | WO-2008100720 A1 | 8/2008 |
| WO | WO-2011/109563 A3 | 11/2011 |

OTHER PUBLICATIONS

Balke, et. al, A Strategy for Interpreting Mulidetector Size-Exclusion Chromatography Data II, Chromatography of Polymers, 1992, 199-219, Chapter 13.
Monrabal et. al, Crystallization Elution Fractionation. A New Separation Process for Polyolefin Resins. Macromol. Symp. 2007, 71-79, 257.
Mourey, Thomas H. and Balke Stephen T. A Strategy for Interpreting Multidetector Size-Exculsion Chromatography data I. Development of a Systematic Approach, Chromatography Polymers, Chapter 12, (1992), 180-198, Chapter 12.
Yau, Wallace W., "Examples of Using 3D-GPC—TREF for Polyolefin Characterization", Macromol. Symp., 2007, 257, 29-45.
Zimm, B.H., Apparatus and Methods for Measurement and Interpretation of the Angular Variation of Light Scattering; Preliminary Results on Polystyrene Solutions, Journal of Chemical Physics 1948, 1099-1116, 16(12).
PCT/US11/057780 Search Report and Written Opinion.

* cited by examiner

Primary Examiner — Nathan M Nutter

(57) ABSTRACT

The instant invention is a sealant composition, method of producing the same, articles made therefrom, and method for forming such articles. The sealant composition according to the present invention comprises: (a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein ethylene/α-olefin interpolymer has a Comonomer Distribution Constant (CDC) in the range of from 15 to 250, and a density in the range of from 0.875 to 0.963 g/cm$^3$, a melt index (I2) in a range of from 0.2 to 20 g/10 minutes, and long chain branching frequency in the range of from 0.02 to 3 long chain branches (LCB) per 1000 C; (b) from 0.5 to 30 percent by weight of a propylene/α-olefin interpolymer composition, wherein said propylene/α-olefin interpolymer composition comprises a propylene/α-olefin copolymer or a propylene/ethylene/butene terpolymer, wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.

15 Claims, 3 Drawing Sheets

SEALANT COMPOSITION, METHOD OF PRODUCING THE SAME

CROSS-REFERENCE TO RELATED APPLICATIONS

This application is a non-provisional application claiming priority from the U.S. Provisional Patent Application No. 61/409,389, filed on Nov. 2, 2010, entitled "SEALANT COMPOSITION, METHOD OF PRODUCING THE SAME," the teachings of which are incorporated by reference herein, as if reproduced in full hereinbelow.

FIELD OF INVENTION

The instant invention relates to a sealant composition, method of producing the same, articles made therefrom, and method for forming such articles.

BACKGROUND OF THE INVENTION

The use of polyethylene compositions in sealant applications is generally known. Any conventional method, such as gas phase process, slurry process, solution process or high pressure process, may be employed to produce such polyethylene compositions.

Various polymerization techniques using different catalyst systems have been employed to produce such polyethylene compositions suitable for sealant applications.

Despite the research efforts in developing sealant compositions, there is still a need for a sealant composition having a lower heat seal and hot tack initiation temperatures while providing increased hot tack and hot seal strength. Additionally, there is a need for a method of producing such sealant composition having a lower heat seal and hot tack initiation temperatures while providing increased hot tack and hot seal strength.

SUMMARY OF THE INVENTION

The instant invention is a sealant composition, method of producing the same, articles made therefrom, and method for forming such articles.

The sealant composition according to the present invention comprises: (a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, and wherein the ethylene/α-olefin interpolymer has a Comonomer Distribution Constant (CDC) in the range of from 15 to 250, and a density in the range of from 0.875 to 0.963 g/cm$^3$, a melt index ($I_2$) in a range of from 0.2 to 20 g/10 minutes, and long chain branching frequency in the range of from 0.02 to 3 long chain branches (LCB) per 1000 C; (b) from 0.5 to 30 percent by weight of a propylene/α-olefin interpolymer composition, wherein said propylene/α-olefin interpolymer composition comprises a propylene/α-olefin copolymer, wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.

In an alternative embodiment, the instant invention further provides a method for producing a sealant composition comprising the steps of (1) selecting an ethylene/α-olefin interpolymer composition, based on the total weight of the sealant composition, wherein said ethylene/α-olefin interpolymer composition comprises an ethylene/α-olefin interpolymer, and wherein the ethylene/α-olefin interpolymer has a Comonomer Distribution Constant (CDC) in the range of from 15 to 250, and a density in the range of from 0.875 to 0.963 g/cm$^3$, a melt index ($I_2$) in a range of from 0.2 to 20 g/10 minutes, and long chain branching frequency in the range of from 0.02 to 3 long chain branches (LCB) per 1000 C; (2) selecting a propylene/α-olefin interpolymer composition, wherein said propylene/α-olefin interpolymer composition comprises a propylene/α-olefin copolymer, and wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.; (3) blending said ethylene/α-olefin interpolymer composition and said propylene/α-olefin interpolymer composition; (4) thereby forming a sealant composition comprising from 70 to 99.5 percent by weight of said ethylene/α-olefin interpolymer composition and from 0.5 to 30 percent by weight of said propylene/α-olefin interpolymer composition.

In another alternative embodiment, the instant invention further provides a sealing layer comprising a sealant composition comprising: (a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein the ethylene/α-olefin interpolymer has a Comonomer Distribution Constant (CDC) in the range of from 15 to 250, and a density in the range of from 0.875 to 0.963 g/cm$^3$, a melt index ($I_2$) in a range of from 0.2 to 20 g/10 minutes, and long chain branching frequency in the range of from 0.02 to 3 long chain branches (LCB) per 1000 C; and (b) from 0.5 to 30 percent by weight of a propylene/α-olefin interpolymer composition, wherein said propylene/α-olefin interpolymer composition comprises a propylene/α-olefin copolymer, wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.

In another alternative embodiment, the instant invention further provides an article comprising: (1) at least one sealing layer comprising a sealant composition comprising; (a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein the ethylene/α-olefin interpolymer has a Comonomer Distribution Constant (CDC) in the range of from 15 to 250, and a density in the range of from 0.875 to 0.963 g/cm$^3$, a melt index ($I_2$) in a range of from 0.2 to 20 g/10 minutes, and long chain branching frequency in the range of from 0.02 to 3 long chain branches (LCB) per 1000 C; and (b) from 0.5 to 30 percent by weight of a propylene/α-olefin interpolymer composition, wherein said propylene/α-olefin interpolymer composition comprises a propylene/α-olefin copolymer, and wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.; and (2) at least one substrate layer.

In another alternative embodiment, the instant invention further provides a method for forming an article comprising the steps of: (1) selecting a sealant composition comprising: (a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein the ethylene/α-olefin interpolymer has a Comonomer Distribution Constant (CDC) in the range of from 15 to 250, and a density in the range of from 0.875 to 0.963 g/cm³, a melt index ($I_2$) in a range of from 0.2 to 20 g/10 minutes, and long chain branching frequency in the range of from 0.02 to 3 long chain branches (LCB) per 1000 C; and (b) from 0.5 to 30 percent by weight of a propylene/α-olefin interpolymer composition, wherein said propylene/α-olefin interpolymer composition comprises a propylene/α-olefin copolymer, and wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.; (2) selecting at least one substrate layer; (3) applying said sealant composition to at least one surface of said at least one substrate layer; (4) thereby forming at least one sealant layer associated with at least one surface of said at least one substrate layer.

In an alternative embodiment, the instant invention provides a sealant composition, method of producing the same, a sealant layer, articles made therefrom, and method of making such articles, in accordance with any of the preceding embodiments, except that the sealant composition has a heat seal strength measured in lb of force in a three-layer film structure of equal or greater than $[((0.7053)(T))-(47.521)]$, wherein T is heat seal temperature in the range of 68 to 74° C., wherein heat seal strength is measured via W Kopp heat seal instrument at a temperature in the range of from 68° C. to 74° C.

In an alternative embodiment, the instant invention provides a sealant composition, method of producing the same, a sealant layer, articles made therefrom, and method of making such articles, in accordance with any of the preceding embodiments, except that the sealant composition has a heat seal strength measured in lb of force in a three-layer film structure of equal or greater than $[((0.6322)(T))-(41.0429)]$, wherein T is heat seal temperature in the range of 65 to 72° C., wherein heat seal strength is measured via W Kopp heat seal instrument at a temperature in the range of from 65° C. to 72° C.

In an alternative embodiment, the instant invention provides a sealant composition, method of producing the same, a sealant layer, articles made therefrom, and method of making such articles, in accordance with any of the preceding embodiments, except that the sealant composition has a hot tack force strength (N) in a three-layer film structure of equal or greater than $[((-4.1540)(10^{-6})(T^4))+((1.2797)(10^{-3})(T^3))-((1.4144)(10^{-1})(T^2))+((6.7463)(T))-117.390]$, wherein T is the temperature of the hot tack test in ° C. in the rage of from 50 to 105° C., wherein hot tack is measured via Enepay hot tack instrument at a temperature in the range of from 50 to 105° C.

In an alternative embodiment, the instant invention provides a sealant composition, method of producing the same, a sealant layer, articles made therefrom, and method of making such articles, in accordance with any of the preceding embodiments, except that the ethylene/α-olefin interpolymer comprises less than 120 total unsaturation units/1,000,000 C.

In an alternative embodiment, the instant invention provides a sealant composition, method of producing the same, a sealant layer, articles made therefrom, and method of making such articles, in accordance with any of the preceding embodiments, except that the ethylene/α-olefin interpolymer has a zero shear viscosity ratio (ZSVR) in the range of from greater than 2.1; for example, greater than 2.3, or in the alternative, greater than 2.5; or in the alternative, from 2.5 to 7.0.

In an alternative embodiment, the instant invention provides a sealant composition, method of producing the same, a sealant layer, articles made therefrom, and method of making such articles, in accordance with any of the preceding embodiments, except that the ethylene/α-olefin interpolymer has trisubstitute unsaturation in the range of from less than 20 units/1,000,000 C.

In an alternative embodiment, the instant invention provides a sealant composition, method of producing the same, a sealant layer, articles made therefrom, and method of making such articles, in accordance with any of the preceding embodiments, except that the ethylene/α-olefin interpolymer has vinylene unsaturation in the range of from less than 20 units/1,000,000 C.

In an alternative embodiment, the instant invention provides a sealant composition, method of producing the same, a sealant layer, articles made therefrom, and method of making such articles, in accordance with any of the preceding embodiments, except that the ethylene/α-olefin interpolymer has a molecular weight distribution ($M_w/M_n$) in the range of from 2.0 to 5.0.

In an alternative embodiment, the instant invention provides a sealant composition, method of producing the same, a sealant layer, articles made therefrom, and method of making such articles, in accordance with any of the preceding embodiments, except that the ethylene/α-olefin interpolymer has a melt flow ratio ($I_{10}/I_2$) in the range of from 5 to 15.

In an alternative embodiment, the instant invention provides a sealant composition, method of producing the same, a sealant layer, articles made therefrom, and method of making such articles, in accordance with any of the preceding embodiments, except that the ethylene/α-olefin interpolymer has a crystallinity in the range of from less than 80 percent; for example, less than 75 percent, or in the alternative, from less than 65 percent, or in the alternative, from less than 55 percent, measured via DSC.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
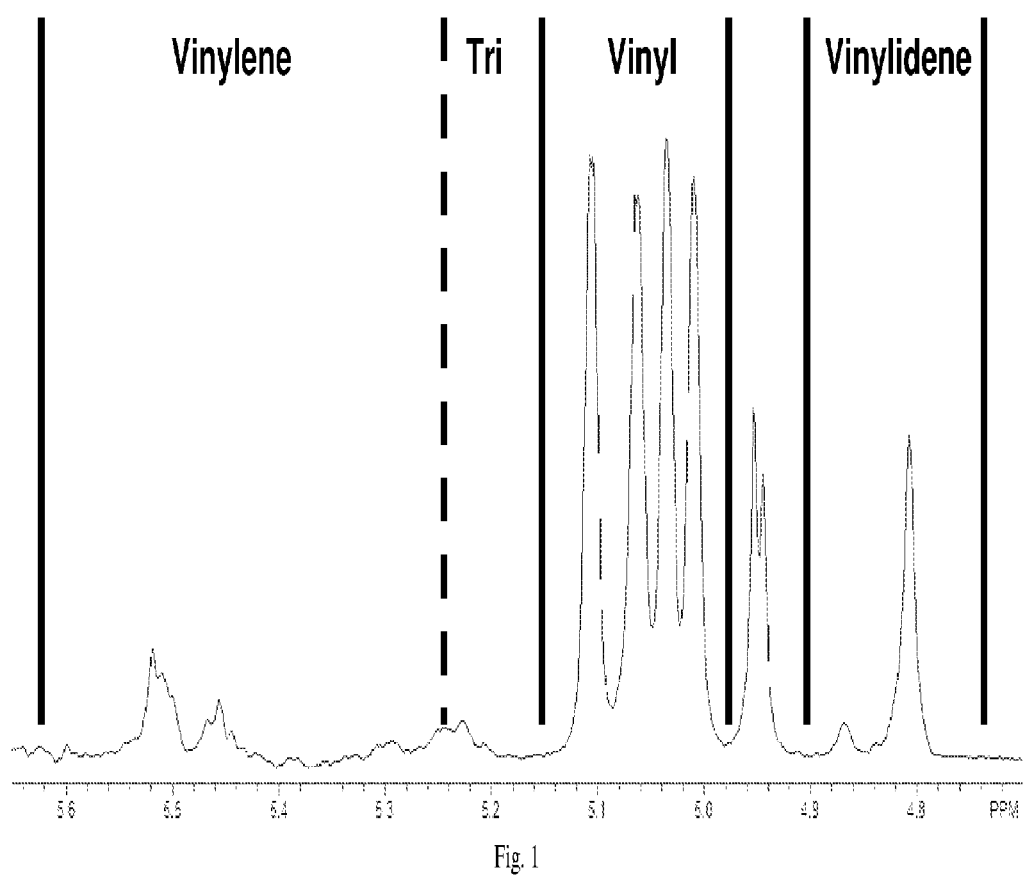
FIG. 1 is a graph illustrating integration limits for unsaturation, wherein the dash line means the position can be slightly different depending on the sample/catalyst.

The instant invention is a sealant composition, method of producing the same, articles made therefrom, and method for forming such articles. The sealant composition according to the present invention comprises (a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein the ethylene/α-olefin interpolymer has a Comonomer Distribution Constant (CDC) in the range of from 15 to 250, and a density in the range of from 0.875 to 0.963 g/cm$^3$, a melt index ($I_2$) in a range of from 0.2 to 20 g/10 minutes, and long chain branching frequency in the range of from 0.02 to 3 long chain branches (LCB) per 1000 C; (b) from 0.5 to 30 percent by weight of a propylene/α-olefin interpolymer composition, wherein said propylene/α-olefin interpolymer composition comprises a propylene/α-olefin copolymer, and wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.

In one embodiment, the sealant composition has a heat seal strength measured in lb of force in a three-layer film structure of equal or greater than $[((0.7053 (T))-(47.521)]$, wherein T is heat seal temperature in the range of 68 to 74° C., wherein heat seal strength is measured via W Kopp heat seal instrument at a temperature in the range of from 68° C. to 74° C.

In an alternative embodiment, the sealant composition has a heat seal strength measured in lb of force in a three-layer film structure of equal or greater than $[((0.6322) (T))-(41.0429)]$, wherein T is heat seal temperature in the range of 65 to 72° C., wherein heat seal strength is measured via W Kopp heat seal instrument at a temperature in the range of from 65° C. to 72° C.

In another alternative embodiment, the sealant composition has a hot tack force strength (N) in a three-layer film structure of equal or greater than $[((-4.1540)(10^{-6})(T^4))+((1.2797)(10^{-3})(T^3))-((1.4144)(10^{-1})(T^2))+((6.7463)(T))-117.390]$, wherein T is the temperature of the hot tack test in ° C. in the rage of from 50 to 105° C., wherein hot tack is measured via Enepay hot tack instrument at a temperature in the range of 50 to 105° C.

The sealant composition may further comprise one or more additives. Such additives include, but are not limited to, anti-static agents, color enhancers, dyes, lubricants, fillers, pigments, primary antioxidants, secondary antioxidants, processing aids, UV stabilizers, and combinations thereof. The sealant composition may contain any amounts of such additives. The sealant composition may, for example, compromise from about 0 to about 20 percent by the combined weight of such additives, based on the weight of the sealant composition and the one or more additives.

Ethylene/α-Olefin Interpolymer Composition

The ethylene/α-olefin interpolymer composition according to instant invention comprises at least one ethylene/α-olefin interpolymer. The ethylene/α-olefin interpolymer according to instant invention has a density in the range of 0.875 to 0.963 g/cm$^3$. All individual values and subranges from 0.875 to 0.963 g/cm$^3$ are included herein and disclosed herein; for example, the density can be from a lower limit of 0.875, 0.880, 0.885, or 0.900 g/cm$^3$ to an upper limit of 0.963, 0.960, 0.955, 0.950, 0.925, 0.920, 0.915, 0.910, or 0.905 g/cm$^3$. For example, the ethylene/α-olefin interpolymer may have a density in the range of 0.875 to 0.960 g/cm$^3$; or in the alternative, the ethylene/α-olefin interpolymer may have a density in the range of 0.905 to 0.963 g/cm$^3$; or in the alternative, the ethylene/α-olefin interpolymer may have a density in the range of 0.875 to 0.920 g/cm$^3$; or in the alternative, the ethylene/α-olefin interpolymer may have a density in the range 0.875 to 0.910 g/cm$^3$; or in the alternative, the ethylene/α-olefin interpolymer may have a density in the range 0.875 to 0.905 g/cm$^3$; or in the alternative, the ethylene/α-olefin interpolymer may have a density in the range 0.875 to 0.902 g/cm$^3$; or in the alternative, the ethylene/α-olefin interpolymer may have a density in the range 0.875 to 0.900 g/cm$^3$.

The ethylene/α-olefin interpolymer has a Comonomer Distribution Constant (CDC) in the range of from 15 to 250. In one embodiment, the ethylene/α-olefin interpolymer has a Comonomer Distribution Constant (CDC) in the range of from 30 to 250. In another embodiment, the ethylene/α-olefin interpolymer has a Comonomer Distribution Constant (CDC) in the range of from 80 to 150. In another embodiment, the ethylene/α-olefin interpolymer has a Comonomer Distribution Constant (CDC) in the range of from 30 to 50.

The ethylene/α-olefin interpolymer has a long chain branching frequency in the range of from 0.02 to 3 long chain branches (LCB) per 1000 C; for example, 0.05 to 3 long chain branches (LCB) per 1000 C, or in the alternative, 0.5 to 3 long chain branches (LCB) per 1000 C.

The ethylene/α-olefin interpolymer has a crystallinity in the range of from less than 80 percent; for example, less than 75 percent, or in the alternative, from less than 65 percent, or in the alternative, from less than 55 percent, measured via DSC.

The ethylene/α-olefin interpolymer according to the instant invention has a molecular weight distribution ($M_w/M_n$) (measured according to the conventional GPC method) in the range of from greater than 2.0. All individual values and subranges from greater than 2 are included herein and disclosed herein; for example, the ethylene/α-olefin interpolymer may have a molecular weight distribution ($M_w/M_n$) in the range of from greater than 2 and less than 5; or in the alternative, the ethylene/α-olefin interpolymer may have a molecular weight distribution ($M_w/M_n$) in the range of greater than 2 and less than 4.

The inventive ethylene/alpha-olefin interpolymer has a molecular weight ($M_w$) in the range of from equal to or greater than 50,000 g/mole, for example, in the range of from 50,000 to 220,000 g/moles.

The ethylene/α-olefin interpolymer according to the instant invention has a melt index ($I_2$) in the range of 0.2 to 20 g/10 minutes. All individual values and subranges from 0.2 to 20 g/10 minutes are included herein and disclosed herein; for example, the melt index ($I_2$) can be from a lower limit of 0.2, 0.5, 0.6, 0.8, or 0.9 g/10 minutes, to an upper limit of 0.9, 1, 1.5, 2.0, 2.5, 3.0, 3.5, 4.0, 4.5, 5.0, 10, 15, or 20 g/10 minutes. For example, the ethylene/α-olefin interpolymer may have a melt index ($I_2$) in the range of 0.5 to 15 g/10 minutes; or in the alternative, the ethylene/α-olefin interpolymer may have a melt index ($I_2$) in the range of 0.5 to 10 g/10 minutes; or in the alternative, the ethylene/α-olefin interpolymer may have a melt index ($I_2$) in the range of 0.5 to 5 g/10 minutes; or in the alternative, the ethylene/α-olefin interpolymer may have a melt index ($I_2$) in the range of 0.5 to 4 g/10 minutes; or in the alternative, the ethylene/α-olefin interpolymer may have a melt index ($I_2$) in the range of 0.5 to 3 g/10 minutes; or in the alternative, the ethylene/α-olefin interpolymer may have a melt index ($I_2$) in the range of 0.5 to 2 g/10 minutes; or in the alternative, the ethylene/α-olefin interpolymer may have a melt index (b) in the range of 0.5 to 1 g/10 minutes.

In one embodiment, the ethylene/α-olefin interpolymer according to the instant invention has a melt flow ratio ($I_{10}/I_2$) in the range of from 5 to 15. All individual values and subranges from 5 to 15 are included herein and disclosed herein; for example, the melt flow ratio ($I_{10}/I_2$) can be from a lower limit of 5, 5.5, 6, or 6.5 to an upper limit of 8, 10, 12, 14, or 15. For example, the ethylene/α-olefin interpolymer may have a melt flow ratio ($I_{10}/I_2$) in the range of from 5 to 14; or in the alternative, the ethylene/α-olefin interpolymer may have a melt flow ratio ($I_{10}/I_2$) in the range of from 5 to 12; or in the alternative, the ethylene/α-olefin interpolymer may have a melt flow ratio ($I_{10}/I_2$) in the range of from 6 to 12; or in the alternative, the ethylene/α-olefin interpolymer may have a melt flow ratio ($I_{10}/I_2$) in the range of from 7 to 14.

In one embodiment, the ethylene/α-olefin interpolymer has less than 120 total unsaturation unit/1,000,000 C. All individual values and subranges from less than 120 total unsaturation unit/1,000,000 C are included herein and disclosed herein; for example, the ethylene/α-olefin interpolymer may have a less than 100 total unsaturation unit/1,000,000 C; or in the alternative, less than 50 total unsaturation unit/1,000,000 C; or in the alternative, less than 20 total unsaturation unit/1,000,000 C.

The ethylene/α-olefin interpolymer has a zero shear viscosity ratio (ZSVR) in the range of from equal to or greater than 2.1; for example from equal to or greater than 2.3, or in the alternative, from equal to or greater than 2.5; or in the alternative, from 2.1 to 7.0; or in the alternative, from 2.3 to 7.0; or in the alternative, from 2.5 to 7.0.

In one embodiment, the ethylene/α-olefin interpolymer may further comprise at least 0.01 parts by weight of metal residues and/or metal oxide residues remaining from the catalyst system comprising a metal complex of a polyvalent aryloxyether per one million parts of the ethylene/α-olefin interpolymer. The metal residues and/or metal oxide residues remaining from the catalyst system comprising a metal complex of a polyvalent aryloxyether in the ethylene/α-olefin interpolymer may be measured by x-ray fluorescence (XRF), which is calibrated to reference standards.

The ethylene/alpha-olefin interpolymer may comprise less than 20 percent by weight of units derived from one or more α-olefin comonomers. All individual values and subranges from less than 18 weight percent are included herein and disclosed herein; for example, the ethylene/alpha-olefin interpolymer may comprise from less than 15 percent by weight of units derived from one or more α-olefin comonomers; or in the alternative, the ethylene/alpha-olefin interpolymer may comprise from less than 10 percent by weight of units derived from one or more α-olefin comonomers; or in the alternative, the ethylene/alpha-olefin interpolymer may comprise from 1 to 20 percent by weight of units derived from one or more α-olefin comonomers; or in the alternative, the inventive ethylene/alpha-olefin interpolymer may comprise from 1 to 10 percent by weight of units derived from one or more α-olefin comonomers.

The ethylene/alpha-olefin interpolymer may comprise less than 10 percent by moles of units derived from one or more α-olefin comonomers. All individual values and subranges from less than 10 mole percent are included herein and disclosed herein; for example, the ethylene/alpha-olefin interpolymer may comprise from less than 7 percent by moles of units derived from one or more α-olefin comonomers; or in the alternative, the ethylene/alpha-olefin interpolymer may comprise from less than 4 percent by moles of units derived from one or more α-olefin comonomers; or in the alternative, the ethylene/alpha-olefin interpolymer may comprise from less than 3 percent by moles of units derived from one or more α-olefin comonomers; or in the alternative, the ethylene/alpha-olefin interpolymer may comprise from 0.5 to 10 percent by moles of units derived from one or more α-olefin comonomers; or in the alternative, the ethylene/alpha-olefin interpolymer may comprise from 0.5 to 3 percent by moles of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene/alpha-olefin interpolymer may comprise at least 80 percent by weight of units derived from ethylene. All individual values and subranges from at least 80 weight percent are included herein and disclosed herein; for example, the ethylene/alpha-olefin interpolymer may comprise at least 82 percent by weight of units derived from ethylene; or in the alternative, the ethylene/alpha-olefin interpolymer may comprise at least 85 percent by weight of units derived from ethylene; or in the alternative, the ethylene/alpha-olefin interpolymer may comprise at least 90 percent by weight of units derived from ethylene; or in the alternative, the ethylene/alpha-olefin interpolymer may comprise from 80 to 99 percent by weight of units derived from ethylene; or in the alternative, the ethylene/alpha-olefin interpolymer may comprise from 90 to 99 percent by weight of units derived from ethylene.

The ethylene/alpha-olefin interpolymer may comprise at least 90 percent by moles of units derived from ethylene. All individual values and subranges from at least 90 mole percent are included herein and disclosed herein; for example, the ethylene/alpha-olefin interpolymer may comprise at least 93 percent by moles of units derived from ethylene; or in the alternative, the ethylene/alpha-olefin interpolymer may comprise at least 96 percent by moles of units derived from ethylene; or in the alternative, the ethylene/alpha-olefin interpolymer may comprise at least 97 percent by moles of units derived from ethylene; or in the alternative, the ethylene/alpha-olefin interpolymer may comprise from 90 to 99.5 percent by moles of units derived from ethylene; or in the alternative, the ethylene/alpha-olefin interpolymer may comprise from 97 to 99.5 percent by moles of units derived from ethylene.

Any conventional polymerization processes may be employed to produce the ethylene/alpha-olefin interpolymers. Such conventional polymerization processes include, but are not limited to, solution polymerization process, gas phase polymerization process, slurry phase polymerization process, and combinations thereof using one or more conventional reactors e.g. loop reactors, isothermal reactors, fluidized bed gas phase reactors, stirred tank reactors, batch reactors in parallel, series, and/or any combinations thereof.

The ethylene/alpha-olefin interpolymer may, for example, be produced via solution-phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 150 to 300° C.; for example, from 160 to 190° C., and at pressures in the range of from 300 to 1000 psi; for example, from 400 to 750 psi. The residence time in solution phase polymerization process is typically in the range of from 2 to 30 minutes; for example, from 10 to 20 minutes. Ethylene, solvent, catalyst system, e.g. a catalyst system comprising a metal complex of a polyvalent aryloxyether, described in further details herein, optionally one or more cocatalysts, and optionally one or more comonomers are fed continuously to the one or more reactors. Exemplary solvents include, but are not limited to, isoparaffins. For example, such solvents are commercially available under the name ISOPAR E from ExxonMobil Chemical Co., Houston, Tex. The resultant mixture of the ethylene/alpha-olefin interpolymer and solvent is then removed from the reactor and the ethylene/alpha-olefin interpolymer is isolated. Solvent is typically recovered via a solvent recovery unit, i.e. heat exchangers and vapor liquid separator drum, and is then recycled back into the polymerization system.

In one embodiment, the ethylene/alpha-olefin interpolymers may be produced via solution polymerization in a dual reactor system, for example a dual loop reactor system, wherein ethylene and optionally one or more α-olefins are polymerized in the presence of a catalyst system comprising a metal complex of a polyvalent aryloxyether at lease in one reactor, wherein said metal complex of a polyvalent aryloxyether corresponds to the formula:

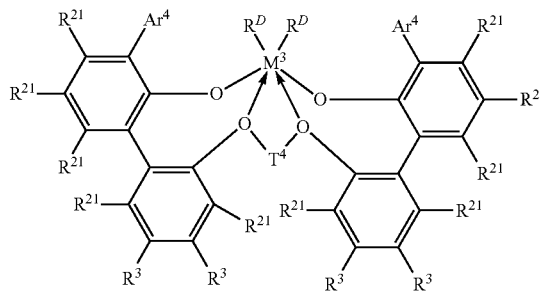

where $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group. Additionally, one or more cocatalysts may be present.

In another embodiment, the ethylene/alpha-olefin interpolymers may be produced via solution polymerization in a single reactor system, for example a single loop reactor system, wherein ethylene and optionally one or more α-olefins are polymerized in the presence of a catalyst system comprising a metal complex of a polyvalent aryloxyether in the single loop reactor system, wherein said metal complex of a polyvalent aryloxyether corresponds to the formula:

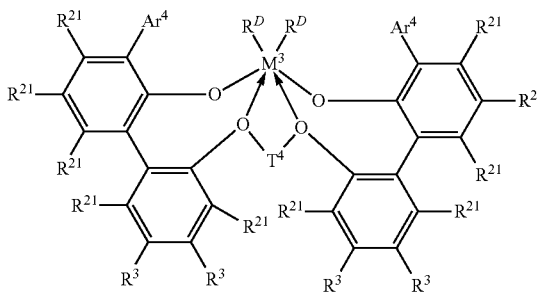

where $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group. Additionally, one or more cocatalysts may be present.

Such polyvalent aryloxyether metal complexes and their synthesis are described in WO 2007/136496 or WO 2007/136497, incorporated herein by reference, using the synthesis procedures disclosed in US-A-2004/0010103, incorporated herein by reference.

The metal complex of a polyvalent aryloxyether may be activated to form an active catalyst composition by combination with one or more cocatalysts, preferably a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to modified methyl aluminoxane (MMAO), bis(hydrogenated tallow alkyl)methyl, tetrakis(pentafluorophenyl)borate(1-)amine (RIBS-2), triethyl aluminum (TEA), and combinations thereof.

In another embodiment, the above-described ethylene/alpha-olefin interpolymers may be produced via solution polymerization in a dual reactor system, for example a dual loop reactor system, wherein ethylene and optionally one or more α-olefins are polymerized in the presence of one or more catalyst systems. Such ethylene/alpha-olefin interpolymers are commercially available under the tradename ELITE™ from The Dow Chemical Company.

In another embodiment, the above-described ethylene/alpha-olefin interpolymers may be produced via solution polymerization in a single reactor system, for example a single loop reactor system, wherein ethylene and optionally one or more α-olefins are polymerized in the presence of one or more catalyst systems. Such ethylene/alpha-olefin interpolymers are commercially available under the tradename AFFINITY™ from The Dow Chemical Company.

The ethylene/alpha-olefin interpolymer composition may further comprise one or more additives. Such additives include, but are not limited to, antistatic agents, color enhancers, dyes, lubricants, fillers, pigments, primary antioxidants, secondary antioxidants, processing aids, UV stabilizers, and combinations thereof. The ethylene/alpha-olefin interpolymer composition may contain any amounts of additives. The ethylene/alpha-olefin interpolymer composition may compromise from about 0 to about 20 percent by the combined weight of such additives, based on the weight of the ethylene/alpha-olefin interpolymer composition and the one or more additives.

Propylene/α-Olefin Interpolymer Composition

The propylene/α-olefin interpolymer composition comprises a propylene/alpha-olefin copolymer and/or a propylene/ethylene/butene terpolymer, and may optionally further comprise one or more polymers, e.g. a random copolymer polypropylene (RCP). In one particular embodiment, the propylene/alpha-olefin copolymer is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/alpha-olefin copolymer may have a melt flow rate in the range of from 0.1 to 500 g/10 minutes, measured in accordance with ASTM D-1238 (at 230° C./2.16 Kg). All individual values and subranges from 0.1 to 500 g/10 minutes are included herein and disclosed herein; for example, the melt flow rate can be from a lower limit of 0.1 g/10 minutes, 0.2 g/10 minutes, or 0.5 g/10 minutes to an upper limit of 500 g/10 minutes, 200 g/10 minutes, 100 g/10 minutes, or 25 g/10 minutes. For example, the propylene/alpha-olefin copolymer may have a melt flow rate in the range of from 0.1 to 200 g/10 minutes; or in the alternative, the propylene/alpha-olefin copolymer may have a melt flow rate in the range of from 0.2 to 100 g/10 minutes; or in the alternative, the propylene/alpha-olefin copolymer may have a melt flow rate in the range of from 0.2 to 50 g/10 minutes; or in the alternative, the propylene/alpha-olefin copolymer may have a melt flow rate in the range of from 0.5 to 50 g/10 minutes; or in the alternative, the propylene/alpha-olefin copolymer may have a melt flow rate in the range of from 1 to 50 g/10 minutes; or in the alternative, the propylene/alpha-olefin copolymer may have a melt flow rate in the range of from 1 to 40 g/10 minutes; or in the alternative, the propylene/alpha-olefin copolymer may have a melt flow rate in the range of from 1 to 30 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via DSC method. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Provisional Patent Application No. 60/988,999 and International Patent Application No. PCT/US08/082,599, each of which is incorporated herein by reference.

The propylene/alpha-olefin interpolymer composition may further comprise one or more additives. Such additives include, but are not limited to, antistatic agents, color enhancers, dyes, lubricants, fillers, pigments, primary antioxidants, secondary antioxidants, processing aids, UV stabilizers, and combinations thereof. The propylene/alpha-olefin interpolymer composition may contain any amounts of additives. The propylene/alpha-olefin composition may compromise from about 0 to about 20 percent by the combined weight of such additives, based on the weight of the propylene/alpha-olefin interpolymer composition and the one or more additives.

Process for Producing the Sealant Composition

One or more ethylene/α-olefin interpolymer compositions and one or more propylene/α-olefin interpolymer compositions, as described herein, may be blended via any method known to a person of ordinary skill in the art including, but not limited to, dry blending, and melt blending via any suitable equipment, for example, an extruder, to produce the inventive sealant composition.

End-Use Applications of the Sealant Composition

The sealant compositions according to the present invention may be used in any sealing applications, for example, food and specialty packaging applications.

In one embodiment, the instant invention provides a sealing layer comprising a sealant composition comprising: (a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein the ethylene/α-olefin interpolymer has a Comonomer Distribution Constant (CDC) in the range of from 15 to 250, and a density in the range of from 0.875 to 0.963 g/cm³, a melt index ($I_2$) in a range of from 0.2 to 20 g/10 minutes, and long chain branching frequency in the range of from 0.02 to 3 long chain branches (LCB) per 1000 C; and (b) from 0.5 to 30 percent by weight of a propylene/α-olefin interpolymer composition, wherein said propylene/α-olefin interpolymer composition comprises a propylene/α-olefin copolymer, wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.

In another alternative embodiment, the instant invention provides an article comprising: (1) at least one sealing layer comprising a sealant composition comprising; (a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein the ethylene/α-olefin interpolymer has a Comonomer Distribution Constant (CDC) in the range of from 15 to 250, and a density in the range of from 0.875 to 0.963 g/cm³, a melt index ($I_2$) in a range of from 0.2 to 20 g/10 minutes, and long chain branching frequency in the range of from 0.02 to 3 long chain branches (LCB) per 1000 C; and (b) from 0.5 to 30 percent by weight of a propylene/α-olefin interpolymer composition, wherein said propylene/α-olefin interpolymer composition comprises a propylene/α-olefin copolymer, and wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.; and (2) at least one substrate layer.

In another alternative embodiment, the instant invention provides a method for forming an article comprising the steps of: (1) selecting a sealant composition comprising: (a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein the ethylene/α-olefin interpolymer has a Comonomer Distribution Constant (CDC) in the range of from 15 to 250, and a density in the range of from 0.875 to 0.963 g/cm³, a melt index ($I_2$) in a range of from 0.2 to 20 g/10 minutes, and long chain branching frequency in the range of from 0.02 to 3 long chain branches (LCB) per 1000 C; and (b) from 0.5 to 30 percent by weight of a propylene/α-olefin interpolymer composition, wherein said propylene/α-olefin interpolymer composition comprises a propylene/α-olefin copolymer, and wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.; (2) selecting at least one substrate layer; (3) applying said sealant composition to at least one surface of said at least one substrate layer; (4) thereby forming at least one sealant layer associated with at least one surface of said at least one substrate layer.

The sealant compositions of the present invention have shown to improve hot tack and heat seal performance, including increased hot tack and hot seal strength, lower heat seal and hot tack initiation temperatures, and broadening of the hot tack window.

EXAMPLES

Inventive Sealant Composition 1

Inventive sealant composition 1 comprises (a) 90% by weight of an ethylene-octene interpolymer (designated herein as ethylene-octene interpolymer A), commercially available under the tradename ELITE™ 5500 G from The Dow Chemical Company, having a density of approximately 0.9141 g/cm³, a melt index (I₂), measured at 190° C. and 2.16 kg, of approximately 1.5 g/10 minutes, an melt flow ratio (I₁₀/I₂) of approximately 7.3; and (b) 10% by weight of a propylene-ethylene interpolymer, commercially available under the tradename VERSIFY™ 2200 from The Dow Chemical Company, having a melt flow rate, measured at 230° C. and 2.16 kg, of approximately 2.0 g/10 minutes. Additional properties of the ethylene-octene interpolymer A were measured, and are reported in Table 1.

Inventive Sealant Composition 2

Inventive sealant composition 2 comprises (a) 90% by weight of an ethylene-octene interpolymer (designated herein as ethylene-octene interpolymer B), having a density of approximately 0.9014 g/cm³, a melt index (I₂), measured at 190° C. and 2.16 kg, of approximately 1.0 g/10 minutes, an melt flow ratio (I₁₀/I₂) of approximately 6.5; and (b) 10% by weight of a propylene-ethylene interpolymer, commercially available under the tradename VERSIFY™ 2200 from The Dow Chemical Company, having a melt flow rate, measured at 230° C. and 2.16 kg, of approximately 2.0 g/10 minutes. Additional properties of ethylene-octene interpolymer B were measured, and are reported in Table 1.

Ethylene-octene interpolymer B was prepared via solution polymerization in a single loop reactor system in the presence of a Zirconium based catalyst system comprising [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)-Zirconium, represented by the following formula:

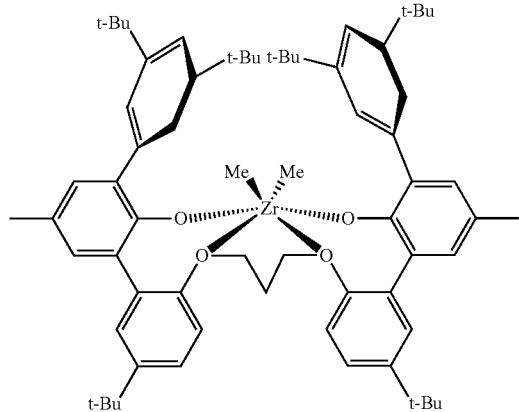

Inventive Sealant Composition 3

Inventive sealant composition 3 comprises (a) 90% by weight of an ethylene-octene interpolymer (designated herein as ethylene-octene interpolymer C), having a density of approximately 0.9029 g/cm³, a melt index (I₂), measured at 190° C. and 2.16 kg, of approximately 0.90 g/10 minutes, an melt flow ratio (I₁₀/I₂) of approximately 10.7; and (b) 10% by weight of a propylene-ethylene interpolymer, commercially available under the tradename VERSIFY™ 2200 from The Dow Chemical Company, having a melt flow rate, measured at 230° C. and 2.16 kg, of approximately 2.0 g/10 minutes. Additional properties of ethylene-octene interpolymer C were measured, and are reported in Table 1.

Ethylene-octene interpolymer C was prepared via solution polymerization in a dual loop reactor system in the presence of a Zirconium based catalyst system comprising [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)-Zirconium, represented by the following formula:

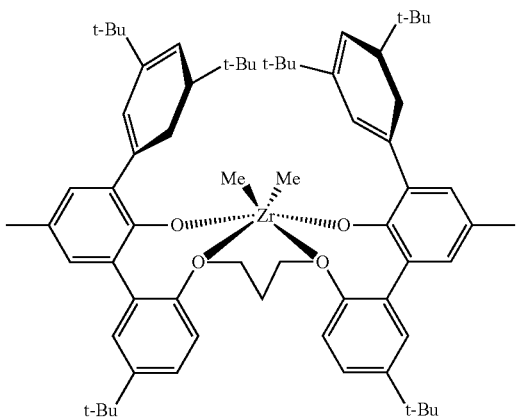

The polymerization conditions for Ethylene-octene interpolymer C is reported in Tables 2 and 3. Referring to Tables 2 and 3, MMAO is modified methyl aluminoxane; and RIBS-2 is bis(hydrogenated tallow alkyl)methyl, tetrakis(pentafluorophenyl)borate(1-)amine.

Inventive Sealant Composition 4

Inventive sealant composition 3 comprises (a) 90% by weight of an ethylene-octene interpolymer (designated herein as ethylene-octene interpolymer D), having a density of approximately 0.9071 g/cm³, a melt index (I₂), measured at 190° C. and 2.16 kg, of approximately 0.84 g/10 minutes, an melt flow ratio (I₁₀/I₂ of approximately 7.3; and (b) 10% by weight of a propylene-ethylene interpolymer, commercially available under the tradename VERSIFY™ 2200 from The Dow Chemical Company, having a melt flow rate, measured at 230° C. and 2.16 kg, of approximately 2.0 g/10 minutes. Additional properties of ethylene-octene interpolymer D were measured, and are reported in Table 1.

Ethylene-octene interpolymer D was prepared via solution polymerization in a dual loop reactor system in the presence of a Zirconium based catalyst system comprising [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)-Zirconium, represented by the following formula:

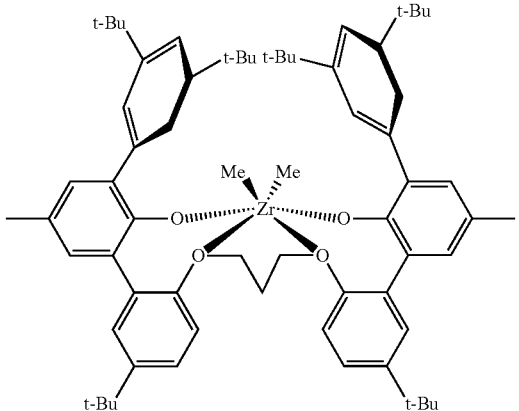

Comparative Sealant Composition 1

Comparative sealant composition 1 comprises 100% by weight of an ethylene-octene interpolymer (designated herein as ethylene-octene interpolymer A, as described hereinabove), commercially available under the tradename ELITE™ 5500G from The Dow Chemical Company, having a density of approximately 0.9141 g/cm³, a melt index ($I_2$), measured at 190° C. and 2.16 kg, of approximately 1.5 g/10 minutes, an melt flow ratio ($I_{10}/I_2$) of approximately 7.3. Additional properties of the ethylene-octene interpolymer A were measured, and are reported in Table 1.

Comparative Sealant Composition 2

Comparative sealant composition 2 comprises 100% by weight of an ethylene-octene interpolymer (designated herein as ethylene-octene interpolymer E), commercially available under the tradename DOWLEX™ 2056 from The Dow Chemical Company, having a density of approximately 0.920 g/cm³, a melt index ($I_2$), measured at 190° C. and 2.16 kg, of approximately 1.0 g/10 minutes. Additional properties of the ethylene-octene interpolymer E were measured, and are reported in Table 1.

Comparative Sealant Composition 3

Comparative sealant composition 3 comprises (a) 90% by weight of an ethylene-octene interpolymer (designated herein as ethylene-octene interpolymer E, as described hereinabove), commercially available under the tradename DOWLEX™ 2056 from The Dow Chemical Company, having a density of approximately 0.920 g/cm³, a melt index ($I_2$), measured at 190° C. and 2.16 kg, of approximately 1.0 g/10 minutes; and (b) 10% by weight of a propylene-ethylene interpolymer, commercially available under the tradename VERSIFY™ 2200 from The Dow Chemical Company, having a melt flow rate, measured at 230° C. and 2.16 kg, of approximately 2.0 g/10 minutes. Additional properties of the ethylene-octene interpolymer E were measured, and are reported in Table 1.

Comparative Sealant Composition 4

Comparative sealant composition 4 comprises 100 percent by weight of an ethylene-octene interpolymer (designated herein as ethylene-octene interpolymer B, as described hereinabove), having a density of approximately 0.9014 g/cm³, a melt index ($I_2$), measured at 190° C. and 2.16 kg, of approximately 1.0 g/10 minutes, a melt flow ratio ($I_{10}/I_2$) of approximately 6.5. Additional properties of ethylene-octene interpolymer B were measured, and are reported in Table 1.

Comparative Sealant Composition 5

Comparative sealant composition 5 comprises 100 percent by weight of an ethylene-octene interpolymer (designated herein as ethylene-octene interpolymer D, as described hereinabove), having a density of approximately 0.9071 g/cm³, a melt index ($I_2$), measured 190° C. and 2.16 kg, of approximately 0.84 g/10 minutes, a melt flow ratio ($I_{10}/I_2$) of approximately 7.3. Additional properties of ethylene-octene interpolymer D were measured, and are reported in Table 1.

Inventive Three Layer Films 1-4

Inventive three layer films 1-4 are fabricated via coextrusion process. The fabrication apparatus contains three extruders: (1) extruder 1 having a 25 mm barrel diameter; (2) extruder 2 having a 30 mm barrel diameter, and (3) extruder 3 having a 25 mm barrel diameter, each of which can fabricate a film layer. Average total output of all the three extruders, depending on the material, is approximately 10-15 kg/hr. Each extruder has a standard single flight forwarding screw. The die diameter is 60 mm. Maximum takeoff speed of the line is 30 m/min. The extrusion conditions are reported in Tables 4-5.

Inventive three layer film 1 comprises: (1) 25 percent by weight of a skin layer, based on the total weight of the three layer film, which was fabricated via extruder number 1, comprising Ultramid C33L01; (2) 50 percent by weight of a core layer, based on the total weight of the three layer film, which was fabricated via extruder number 2, comprising 90 percent by weight of ATTANE™ 4201 and 10 percent by weight of AMPLIFY™ GR-205, based on the total weight of the core layer; (3) 25 percent by weight of inventive sealant composition 1, as described above, based on the total weight of the three layer film, which was fabricated via extruder number 3.

Inventive three layer film 2 comprises: (1) 25 percent by weight of a skin layer, based on the total weight of the three layer film, which was fabricated via extruder number 1, comprising Ultramid C33L01; (2) 50 percent by weight of a core layer, based on the total weight of the three layer film, which was fabricated via extruder number 2, comprising 90 percent by weight of ATTANE™ 4201 and 10 percent by weight of AMPLIFY™ GR-205, based on the total weight of the core layer; (3) 25 percent by weight of inventive sealant composition 2, as described above, based on the total weight of the three layer film, which was fabricated via extruder number 3.

Inventive three layer film 3 comprises: (1) 25 percent by weight of a skin layer, based on the total weight of the three layer film, which was fabricated via extruder number 1, comprising Ultramid C33L01; (2) 50 percent by weight of a core layer, based on the total weight of the three layer film, which was fabricated via extruder number 2, comprising 90 percent by weight of ATTANE™ 4201 and 10 percent by weight of AMPLIFY™ GR-205, based on the total weight of the core layer; (3) 25 percent by weight of inventive sealant composition 3, as described above, based on the total weight of the three layer film, which was fabricated via extruder number 3.

Inventive three layer film 4 comprises: (1) 25 percent by weight of a skin layer, based on the total weight of the three layer film, which was fabricated via extruder number 1, comprising Ultramid C33L01; (2) 50 percent by weight of a core layer, based on the total weight of the three layer film, which was fabricated via extruder number 2, comprising 90 percent by weight of ATTANE™ 4201 and 10 percent by weight of AMPLIFY™ GR-205, based on the total weight of the core layer; (3) 25 percent by weight of inventive sealant composition 4, as described above, based on the total weight of the three layer film, which was fabricated via extruder number 3.

Figure 2:
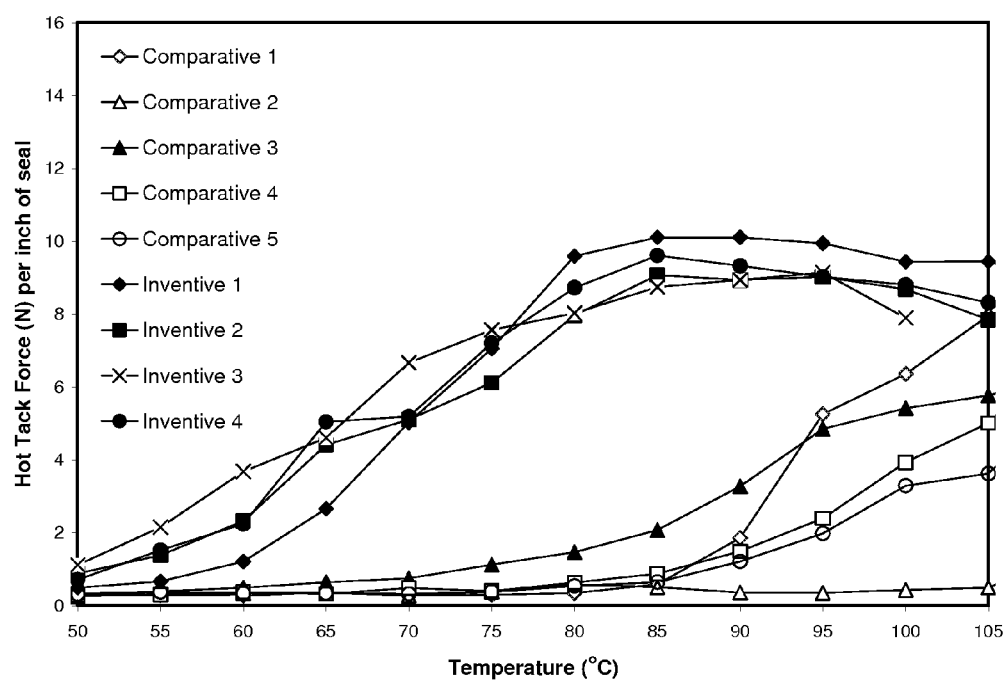
FIG. 2 is a graph illustrating the relationship between the hot tack force (N) per inch of seal and the hot tack temperature (° C.) of the inventive and comparative sealant compositions.
Figure 3:
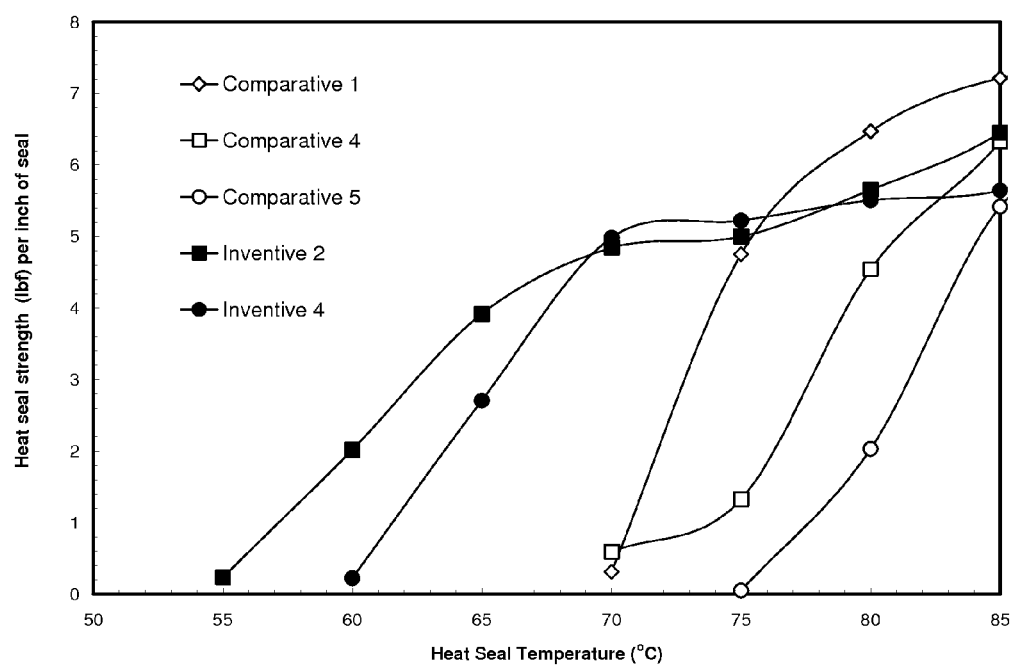
FIG. 3 is a graph illustrating the relationship between the heat seal strength (lbf) per inch of seal and the heat seal temperature (° C.) of the inventive and comparative sealant compositions.

Inventive three layer films 1-4 were tested for their sealant properties, and the results are reported in FIGS. 2 and 3.

Comparative Three layer Films 1-5

Comparative three layer films 1-5 are fabricated via coextrusion process. The fabrication apparatus contains three extruders: (1) extruder 1 having a 25 mm barrel diameter; (2) extruder 2 having a 30 mm barrel diameter, and (3) extruder 3 having a 25 mm barrel diameter, each of which can fabricate a film layer. Average total output of all the three extruders, depending on the material, is approximately 10-15 kg/hr. Each extruder has a standard single flight forwarding screw. The die diameter is 60 mm. Maximum takeoff speed of the line is 30 m/min. The extrusion conditions are reported in Tables 6-7.

Comparative three layer film 1 comprises: (1) 25 percent by weight of a skin layer, based on the total weight of the three layer film, which was fabricated via extruder number 1, comprising Ultramid C33L01; (2) 50 percent by weight of a core layer, based on the total weight of the three layer film, which was fabricated via extruder number 2, comprising 90 percent by weight of ATTANE™ 4201 and 10 percent by weight of AMPLIFY™ GR-205, based on the total weight of the core layer; (3) 25 percent by weight of comparative sealant composition 1, as described above, based on the total weight of the three layer film, which was fabricated via extruder number 3.

Comparative three layer film 2 comprises: (1) 25 percent by weight of a skin layer, based on the total weight of the three layer film, which was fabricated via extruder number 1, comprising Ultramid C33L01; (2) 50 percent by weight of a core layer, based on the total weight of the three layer film, which was fabricated via extruder number 2, comprising 90 percent by weight of ATTANE™ 4201 and 10 percent by weight of AMPLIFY™ GR-205, based on the total weight of the core layer; (3) 25 percent by weight of comparative sealant composition 2, as described above, based on the total weight of the three layer film, which was fabricated via extruder number 3.

Comparative three layer film 3 comprises: (1) 25 percent by weight of a skin layer, based on the total weight of the three layer film, which was fabricated via extruder number 1, comprising Ultramid C33L01; (2) 50 percent by weight of a core layer, based on the total weight of the three layer film, which was fabricated via extruder number 2, comprising 90 percent by weight of ATTANE™ 4201 and 10 percent by weight of AMPLIFY™ GR-205, based on the total weight of the core layer; (3) 25 percent by weight of comparative sealant composition 3, as described above, based on the total weight of the three layer film, which was fabricated via extruder number 3.

Comparative three layer film 4 comprises: (1) 25 percent by weight of a skin layer, based on the total weight of the three layer film, which was fabricated via extruder number 1, comprising Ultramid C33L01; (2) 50 percent by weight of a core layer, based on the total weight of the three layer film, which was fabricated via extruder number 2, comprising 90 percent by weight of ATTANE™ 4201 and 10 percent by weight of AMPLIFY™ GR-205, based on the total weight of the core layer; (3) 25 percent by weight of comparative sealant composition 4, as described above, based on the total weight of the three layer film, which was fabricated via extruder number 3.

Comparative three layer film 5 comprises: (1) 25 percent by weight of a skin layer, based on the total weight of the three layer film, which was fabricated via extruder number 1, comprising Ultramid C33L01; (2) 50 percent by weight of a core layer, based on the total weight of the three layer film, which was fabricated via extruder number 2, comprising 90 percent by weight of ATTANE™ 4201 and 10 percent by weight of AMPLIFY™ GR-205, based on the total weight of the core layer; (3) 25 percent by weight of comparative sealant composition 5, as described above, based on the total weight of the three layer film, which was fabricated via extruder number 3.

Comparative three layer films 1-5 were tested for their sealant properties, and the results are reported in FIGS. 1 and 3.

TABLE 1

| Sample ID | Ethylene-Octene Interpolymer C | Ethylene-Octene Interpolymer D | Ethylene-Octene Interpolymer E | Ethylene-Octene Interpolymer B | Ethylene-Octene Interpolymer A |
|---|---|---|---|---|---|
| Density (g/cm$^3$) | 0.9029 | 0.9071 | — | 0.9014 | 0.9141 |
| $I_2$ (g/10 minutes) | 0.9 | 0.8 | — | 1.0 | 1.5 |
| $I_{10}/I_2$ | 10.7 | 7.3 | — | 6.5 | 7.3 |
| Unsaturation/1,000,000 C. | | | | | |
| vinylene | 9 | 12 | 49 | 6 | 41 |
| trisubstitute | 2 | 3 | 22 | 0 | 32 |
| vinyl | 38 | 47 | 277 | 25 | 149 |
| vinylidene | 7 | 6 | 53 | 1 | 30 |
| Total unsaturation | 55 | 68 | 401 | 32 | 251 |
| CEF | | | | | |
| Comonomer distribution Index | 0.911 | 0.910 | 0.476 | 0.956 | 0.246 |
| Stdev | 9.725 | 12.332 | 18.615 | 6.625 | 27.884 |
| Half width, C | 23.568 | 19.515 | 22.384 | 7.537 | 42.67 |
| Half width/Stdev | 2.423 | 1.582 | 1.202 | 1.138 | 1.530 |
| CDC (Comonomer Distribution Constant) | 37.6 | 57.5 | 39.6 | 84.0 | 16.1 |
| Wt % of Material eluting above 94.0° C. | 0.0% | 0.1% | 25.2% | 0.0% | 27.0% |
| Conventional GPC | | | | | |
| $M_n$ | 39079 | 45450 | 27642 | 45650 | 28800 |
| $M_w$ | 93498 | 98850 | 118042 | 95860 | 105100 |
| $M_z$ | 173835 | 184300 | 357962 | 162800 | 374900 |
| $M_w/M_n$ | 2.4 | 2.2 | 4.3 | 2.1 | 3.6 |
| Rheology | | | | | |
| Viscosity (Pa · s) | 13236 | 14378 | 10455 | 9372 | 6256 |
| Mw-GPC | 93498 | 98850 | 118042 | 95860 | 105100 |
| ZSVR | 4.2 | 3.7 | 1.4 | 2.7 | 1.3 |
| DSC | | | | | |
| $T_m$ (° C.) | 102.1 | 105.9 | — | 97.9 | 120.2 |
| Heat of fusion (J/g) | 109 | 117 | — | 106 | 132 |
| % Cryst. | 37.3% | 40.1% | — | 36.2% | 45.1% |

TABLE 2

| 1. REACTOR FEEDS | Unit | Ethylene-Octene Interpolymer C |
|---|---|---|
| Primary Reactor Feed Temperature | ° C. | 35.02 |
| Primary Reactor Total Solvent Flow | lbs/hr | 1057.29 |

TABLE 2-continued

| 1. REACTOR FEEDS | Unit | Ethylene-Octene Interpolymer C |
|---|---|---|
| Primary Reactor Fresh Ethylene Flow | lbs/hr | 183.75 |
| Primary Reactor Total Ethylene Flow | lbs/hr | 192.21 |
| Comonomer Type Used | | 1-octene |
| Primary Reactor Fresh Comonomer Flow | lbs/hr | 67.04 |
| Primary Reactor Total Comonomer Flow | lbs/hr | 104.08 |
| Primary Reactor Comonomer/Olefin Ratio | % | 35.11 |
| Primary Reactor Feed Solvent/Ethylene Ratio | Ratio | 5.75 |
| Primary Reactor Fresh Hydrogen Flow | Standard $cm^3$/min | 2717 |
| Primary Reactor Hydrogen Mole Percent | mol % | 0.2272 |
| Secondary Reactor Feed Temperature | °C. | 34.55 |
| Secondary Reactor Total Solvent Flow | lbs/hr | 420.06 |
| Secondary Reactor Fresh Ethylene Flow | lbs/hr | 157.24 |
| Secondary Reactor Total Ethylene Flow | lbs/hr | 160.86 |
| Secondary Reactor Fresh Comonomer Flow | lbs/hr | 0.00 |
| Secondary Reactor Total Comonomer Flow | lbs/hr | 16.42 |
| Secondary Reactor Comonomer/Olefin Ratio | % | 9.24 |
| Secondary Reactor Feed Solvent/Ethylene Ratio | Ratio | 2.67 |
| Secondary Reactor Fresh Hydrogen Flow | Standard $cm^3$/minute | 3029 |
| Secondary Reactor Hydrogen Mole Percent | mol % | 0.2966 |
| Fresh Comonomer Injection Location | — | Secondary Reactor |

TABLE 3

| | Unit | Ethylene-Octene Interpolymer C |
|---|---|---|
| 2. REACTION | | |
| Primary Reactor Control Temperature | °C. | 150.02 |
| Primary Reactor Pressure | psig | 725.01 |
| Primary Reactor Ethylene Conversion | % | 94.87 |
| Primary Reactor Percent Solids | % | 20.16 |
| Primary Reactor Polymer Residence Time | hrs | 0.29 |
| Secondary Reactor Control Temperature | °C. | 190.04 |
| Secondary Reactor Pressure | psig | 725.25 |
| Secondary Reactor Ethylene Conversion | % | 84.99 |
| Secondary Reactor Percent Solids | % | 23.64 |
| Secondary Reactor Polymer Residence Time | hrs | 0.11 |
| Vent Ethylene Conversion | % | 92.66 |
| Primary Reactor Split | % | 58.33 |
| 3. CATALYST | | |
| Primary Reactor Catalyst Type | — | Zirconium Based Catalyst |
| Primary Reactor Catalyst Flow | lbs/hr | 0.59 |
| Primary Reactor Catalyst Concentration | ppm | 54.71 |
| Primary Reactor Catalyst Efficiency | $10^6$ Lb | 7.76 |
| Primary Reactor Catalyst-1 Mole Weight | mw | 90.86 |
| Primary Reactor Co-Catalyst-1 Molar Ratio | Ratio | 3.07 |
| Primary Reactor Co-Catalyst-1 Type | | RIBS-2 |
| Primary Reactor Co-Catalyst-1 Flow | lbs/hr | 0.27 |
| Primary Reactor Co-Catalyst-1 Concentration | ppm | 4874.87 |
| Primary Reactor Co-Catalyst-2 Molar Ratio | Ratio | 10.06 |
| Primary Reactor Co-Catalyst-2 Type | | MMAO |
| Primary Reactor Co-Catalyst-2 Flow | lbs/hr | 0.27 |
| Primary Reactor Co-Catalyst-2 Concentration | ppm | 359.47 |
| Secondary Reactor Catalyst Type | — | Zirconium Based Catalyst |
| Secondary Reactor Catalyst Flow | lbs/hr | 3.22 |
| Secondary Reactor Catalyst Concentration | ppm | 54.71 |
| Secondary Reactor Catalyst Efficiency | $10^6$ Lb | 1.02 |
| Secondary Reactor Co-Catalyst-1 Molar Ratio | Ratio | 1.48 |
| Secondary Reactor Co-Catalyst-1 Type | — | RIBS-2 |
| Secondary Reactor Co-Catalyst-1 Flow | lbs/hr | 0.71 |

TABLE 3-continued

| | Unit | Ethylene-Octene Interpolymer C |
|---|---|---|
| Secondary Reactor Co-Catalyst-1 Concentration | ppm | 4874.87 |
| Secondary Reactor Co-Catalyst-2 Molar Ratio | Ratio | 9.88 |
| Secondary Reactor Co-Catalyst-2 Type | — | MMAO-3A |
| Secondary Reactor Co-Catalyst-2 Flow | lbs/hr | 1.44 |
| Secondary Reactor Co-Catalyst-2 Concentration | ppm | 359.47 |
| 4. POLYMER | | |
| GI200 Average Gel Area | $mm^2$/24.6 $cm^3$ | 1.46 |
| GI200 Std Dev Gel Area | $mm^2$/24.6 $cm^3$ | 2.99 |

TABLE 4

| | Inventive 1 | Inventive 2 | Inventive 3 | Inventive 4 |
|---|---|---|---|---|
| Die Gap (mm) | 2.0 | 2.0 | 2.0 | 2.0 |
| BUR | 2.5 | 2.5 | 2.5 | 2.5 |
| Thickness (mils) | 3.5 | 3.5 | 3.5 | 3.5 |
| Die Temp 5 (°C.) | 231 | 230 | 230 | 231 |
| Die Temp 4 (°C.) | 231 | 230 | 230 | 230 |
| Die Temp 3 (°C.) | 230 | 230 | 230 | 230 |
| Die Temp 2 (°C.) | 231 | 232 | 232 | 232 |
| Die Temp 1 (°C.) | 230 | 230 | 230 | 230 |
| Takeoff (m/min) | 5 | 5 | 5 | 5.2 |
| Blower (%) | 67 | 67 | 68 | 68 |
| Layflat (cm) | 23.0 | 23.5 | 23.5 | 23.0 |
| Frostline (inches) | 6.8 | 6.14 | 6.12 | 6.12 |
| Total Throughput (lb/hr) | 12.2 | 12.1 | 12.9 | 13.4 |

TABLE 5

| | Inventive 1 | Inventive 2 | Inventive 3 | Inventive 4 |
|---|---|---|---|---|
| Extruder 1 | | | | |
| Barrel 1 temp (°C.) | 180 | 180 | 180 | 180 |
| Barrel 2 temp (°C.) | 210 | 210 | 209 | 209 |
| Barrel 3 temp (°C.) | 230 | 230 | 230 | 230 |
| Barrel 4 temp (°C.) | 230 | 230 | 230 | 230 |
| Adapter temp (°C.) | 230 | 230 | 230 | 230 |
| Tube temp (°C.) | 230 | 230 | 230 | 230 |
| Pressure (bar) | 93 | 113 | 97 | 97 |
| Motor-Current (A) | 1.8 | 2.1 | 2 | 2.2 |
| Throughput (kg/hr) | 3.3 | 3.2 | 3.9 | 4.2 |
| Screw Speed (rpm) | 56 | 62 | 67 | 67 |
| Extruder 2 | | | | |
| Barrel 1 temp (°C.) | 195 | 195 | 195 | 196 |
| Barrel 2 temp (°C.) | 220 | 220 | 220 | 220 |
| Barrel 3 temp (°C.) | 196 | 196 | 196 | 195 |
| Barrel 4 temp (°C.) | 194 | 194 | 196 | 194 |
| Adapter temp (°C.) | 225 | 225 | 225 | 225 |
| Tube temp (°C.) | 225 | 225 | 225 | 225 |
| Pressure (bar) | 352 | 354 | 321 | 311 |
| Motor-Current (A) | 6.6 | 6.4 | 6.5 | 6.2 |
| Throughput (kg/hr) | 5.9 | 6.0 | 6.1 | 6.1 |
| Screw Speed (rpm) | 72 | 71 | 71 | 71 |

TABLE 5-continued

|  | Inventive 1 | Inventive 2 | Inventive 3 | Inventive 4 |
|---|---|---|---|---|
| Extruder 3 | | | | |
| Barrel 1 temp (° C.) | 190 | 190 | 190 | 190 |
| Barrel 2 temp (° C.) | 220 | 220 | 220 | 220 |
| Barrel 3 temp (° C.) | 186 | 183 | 185 | 184 |
| Barrel 4 temp (° C.) | 184 | 184 | 185 | 184 |
| Adapter temp (° C.) | 225 | 225 | 225 | 225 |
| Tube temp (° C.) | 225 | 225 | 225 | 225 |
| Pressure (bar) | 203 | 269 | 216 | 224 |
| Motor-Current (A) | 3.8 | 4.6 | 4.0 | 4.7 |
| Throughput (kg/hr) | 3.0 | 2.9 | 2.9 | 3.1 |
| Screw Speed (rpm) | 67 | 67 | 67 | 67 |

TABLE 6

|  | Comparative 1 | Comparative 2 | Comparative 3 | Comparative 4 | Comparative 5 |
|---|---|---|---|---|---|
| Die Gap (mm) | 2.0 | 2.0 | 2.0 | 2.0 | 2.0 |
| BUR | 2.5 | 2.5 | 2.5 | 2.5 | 2.5 |
| Thickness (mils) | 3.5 | 3.5 | 3.5 | 3.5 | 3.5 |
| Die Temp 5 (° C.) | 230 | 230 | 230 | 230 | 230 |
| Die Temp 4 (° C.) | 230 | 230 | 230 | 230 | 230 |
| Die Temp 3 (° C.) | 230 | 230 | 230 | 230 | 230 |
| Die Temp 2 (° C.) | 232 | 232 | 231 | 232 | 232 |
| Die Temp 1 (° C.) | 230 | 230 | 230 | 230 | 230 |
| Takeoff (m/min) | 5 | 5 | 5 | 5 | 5.1 |
| Blower (%) | 67 | 67 | 67 | 67 | 68 |
| Layflat (cm) | 24.0 | 23.0 | 23.25 | 24.0 | 23.75 |
| Frostline (inches) | 6 | 6.7 | 6.7 | 6.15 | 6.12 |
| Total Throughput (lb/hr) | 12.5 | 12.3 | 12.7 | 12.2 | 12.4 |

TABLE 7

|  | Comparative 1 | Comparative 2 | Comparative 3 | Comparative 4 | Comparative 5 |
|---|---|---|---|---|---|
| Extruder 1 | | | | | |
| Barrel 1 temp (° C.) | 180 | 180 | 180 | 180 | 180 |
| Barrel 2 temp (° C.) | 210 | 210 | 210 | 210 | 210 |
| Barrel 3 temp (° C.) | 230 | 230 | 230 | 231 | 230 |
| Barrel 4 temp (° C.) | 230 | 230 | 230 | 230 | 230 |
| Adapter temp (° C.) | 230 | 230 | 230 | 230 | 230 |
| Tube temp (° C.) | 230 | 230 | 230 | 230 | 230 |
| Pressure (bar) | 102 | 118 | 109 | 119 | 98 |
| Motor-Current (A) | 1.6 | 2.5 | 2 | 2.5 | 1.8 |
| Throughput (kg/hr) | 3.6 | 3.8 | 3.9 | 3.5 | 3.4 |
| Screw Speed (rpm) | 67 | 62 | 62 | 67 | 67 |
| Extruder 2 | | | | | |
| Barrel 1 temp (° C.) | 195 | 195 | 195 | 195 | 195 |
| Barrel 2 temp (° C.) | 220 | 220 | 220 | 219 | 220 |
| Barrel 3 temp (° C.) | 195 | 196 | 194 | 194 | 195 |
| Barrel 4 temp (° C.) | 195 | 196 | 195 | 194 | 194 |
| Adapter temp (° C.) | 225 | 225 | 225 | 225 | 225 |
| Tube temp (° C.) | 225 | 225 | 225 | 225 | 225 |
| Pressure (bar) | 363 | 372 | 360 | 366 | 321 |
| Motor-Current (A) | 6.2 | 6.6 | 6.3 | 6.3 | 6.1 |
| Throughput (kg/hr) | 5.9 | 5.8 | 5.8 | 5.7 | 6.0 |
| Screw Speed (rpm) | 71 | 71 | 71 | 71 | 71 |
| Extruder 3 | | | | | |
| Barrel 1 temp (° C.) | 190 | 190 | 190 | 190 | 190 |
| Barrel 2 temp (° C.) | 220 | 220 | 220 | 220 | 220 |
| Barrel 3 temp (° C.) | 183 | 184 | 185 | 187 | 186 |
| Barrel 4 temp (° C.) | 185 | 184 | 184 | 186 | 186 |
| Adapter temp (° C.) | 225 | 225 | 225 | 225 | 225 |
| Tube temp (° C.) | 225 | 225 | 225 | 225 | 225 |
| Pressure (bar) | 205 | 249 | 242 | 284 | 201 |
| Motor-Current (A) | 3.6 | 4.1 | 3.7 | 5.0 | 4.3 |
| Throughput (kg/hr) | 3.0 | 3.0 | 3.0 | 3.0 | 3.0 |
| Screw Speed (rpm) | 67 | 67 | 67 | 67 | 67 |

TEST METHODS

Equations 1-20 mentioned in the following test methods are shown below:

$$\% \text{ Crystallinity} = ((H_f)/(292 \text{ J/g})) \times 100 \quad \text{Equation 1}$$

$$g_i' = (IV_{sample,i}/IV_{linear\ reference,j}) \quad \text{Equation 2}$$

$$\left[\frac{IV_{Sample,i}}{IV_{linear\_reference,j}}\right]^{1.33}_{M_i=j} = \left[\left(1+\frac{B_{n,i}}{7}\right)^{1/2} + \frac{4}{9}\frac{B_{n,i}}{\pi}\right]^{-1/2} \quad \text{Equation 3}$$

$$LCBf = \frac{\sum_{M=3500}^{i}\left(\frac{B_{n,i}}{M_i/14000}c_i\right)}{\Sigma c_i} \quad \text{Equation 4}$$

$$M_{PE} = \left(\frac{K_{PS}}{K_{PE}}\right)^{\frac{1}{\alpha_{PE}+1}} \cdot M_{PS}^{\frac{\alpha_{PS}+1}{\alpha_{PE}+1}} \quad \text{Equation 5}$$

$$[\eta]_{PE} = K_{PS} \cdot \frac{M_{PS}^{\alpha+1}}{M_{PE}} \quad \text{Equation 6}$$

$$M_W = \sum_i w_i M_i = \quad \text{Equation 7}$$

$$\sum_i \left(\frac{C_i}{\sum_i C_i}\right) M_i = \frac{\sum_i C_i M_i}{\sum_i C_i} = \frac{\sum_i LS_i}{\sum_i C_i} = \frac{LS \text{ Area}}{Conc. \text{ Area}}$$

$$IV = [\eta] = \sum_i w_i IV_i = \quad \text{Equation 8}$$

$$\sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP \text{ Area}}{Conc. \text{ Area}}$$

$$Mw_{CC} = \sum_i \left(\frac{C_i}{\sum_i C_i}\right) M_i = \sum_i w_i M_i \quad \text{Equation 9}$$

$$[\eta]_{CC} = \sum_i \left(\frac{C_i}{\sum_i C_i}\right) IV_i = \sum_i w_i IV_i \quad \text{Equation 10}$$

$$gpcBR = \left[\left(\frac{[\eta]_{CC}}{[\eta]}\right) \cdot \left(\frac{M_W}{M_{W,CC}}\right)^{\alpha_{PE}} - 1\right] \quad \text{Equation 11}$$

$$\text{Resolution} = \frac{\text{Peak temperature of NIST 1475a} - \text{Peak Temperature of Hexacontane}}{\text{Half - height Width of NIST 1475a} + \text{Half - height Width of Hexacontane}} \quad \text{Equation 12}$$

$$CDC = \frac{\text{Comonomer Distribution Index}}{\text{Comonomer distribution Shape Factor}} = \frac{\text{Comonomer Distribution Index}}{\text{Half Width/Stdev}} = 100 \quad \text{Equation 13}$$

$$\int_{35}^{119.0} w_T(T)dT = 1 \qquad \text{Equation 14}$$

$$\int_{35}^{T_{median}} W_T(T)dT = 0.5 \qquad \text{Equation 15}$$

$$\ln(1 - comonomer\,content) = -\frac{207.26}{273.12 + T} + 0.5533 \qquad \text{Equation 16}$$

$$Stdev = \sqrt{\sum_{35.0\;5\;of\;5}^{119.0} (T - T_p)^2 * w_T(T)} \qquad \text{Equation 17}$$

$$ZSVR = \frac{\eta_{0.8}}{\eta_{0L}} \qquad \text{Equation 18}$$

$$\eta_{0L} = 2.29 \times 10^{-15} M_{w-gpc}^{3.65} \qquad \text{Equation 19}$$

$$M_{polyethylene} = A(M_{polystyrene})^B \qquad \text{Equation 20}$$

Test methods include the following:

Density

Samples that are measured for density are prepared according to ASTM D-1928. Measurements are made within one hour of sample pressing using ASTM D-792, Method B.

Melt Index

Melt index ($I_2$) is measured in accordance with ASTM-D 1238, Condition 190° C./2.16 kg, and is reported in grams eluted per 10 minutes. Melt flow rate ($I_{10}$) is measured in accordance with ASTM-D 1238, Condition 190° C./10 kg, and is reported in grams eluted per 10 minutes.

DSC Crystallinity

Differential Scanning calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are peak melting temperature ($T_m$), peak crystallization temperature ($T_c$), heat of fusion ($H_f$) (in Joules per gram), and the calculated % crystallinity for samples using appropriate equation, for example for the ethylene/alpha-olefin interpolymer using Equation 1.

The heat of fusion ($H_f$) and the peak melting temperature are reported from the second heat curve. Peak crystallization temperature is determined from the cooling curve.

Dynamic Mechanical Spectroscopy (DMS) Frequency Sweep

Melt rheology, constant temperature frequency sweeps, were performed using a TA Instruments Advanced Rheometric Expansion System (ARES) rheometer equipped with 25 mm parallel plates under a nitrogen purge. Frequency sweeps were performed at 190° C. for all samples at a gap of 2.0 mm and at a constant strain of 10%. The frequency interval was from 0.1 to 100 radians/second. The stress response was analyzed in terms of amplitude and phase, from which the storage modulus (G'), loss modulus (G"), and dynamic melt viscosity (η*) were calculated.

Gel Permeation Chromatography (GPC)

The ethylene/alpha-olefin interpolymers were tested for their properties via GPC, according to the following procedure. The GPC system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI). Additional detectors can include an IR4 infra-red detector from Polymer ChAR (Valencia, Spain), Precision Detectors (Amherst, Mass.) 2-angle laser light scattering detector Model 2040, and a Viscotek (Houston, Tex.) 150R 4-capillary solution viscometer. A GPC with the last two independent detectors and at least one of the first detectors is sometimes referred to as "3D-GPC", while the term "GPC" alone generally refers to conventional GPC. Depending on the sample, either the 15-degree angle or the 90-degree angle of the light scattering detector is used for calculation purposes. Data collection is performed using Viscotek TriSEC software, Version 3, and a 4-channel Viscotek Data Manager DM400. The system is also equipped with an on-line solvent degassing device from Polymer Laboratories (Shropshire, UK). Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of butylated hydroxytoluene (BHT). Both solvents are sparged with nitrogen. The polyethylene samples are gently stirred at 160° C. for four hours. The injection volume is 200 microliters. The flow rate through the GPC is set at 1 ml/minute.

The GPC column set is calibrated before running the Examples by running twenty-one narrow molecular weight distribution polystyrene standards. The molecular weight (MW) of the standards ranges from 580 to 8,400,000 grams per mole, and the standards are contained in 6 "cocktail" mixtures. Each standard mixture has at least a decade of separation between individual molecular weights. The standard mixtures are purchased from Polymer Laboratories (Shropshire, UK). The polystyrene standards are prepared at 0.025 g in 50 mL of solvent for molecular weights equal to or greater than 1,000,000 grams per mole and 0.05 g in 50 ml of solvent for molecular weights less than 1,000,000 grams per mole. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene $M_w$ using the Mark-Houwink K and a (sometimes referred to as a) values mentioned later for polystyrene and polyethylene. See the Examples section for a demonstration of this procedure. With 3D-GPC, absolute weight average molecular weight ("$M_{w,\,Abs}$") and intrinsic viscosity are also obtained independently from suitable narrow polyethylene standards using the same conditions mentioned previously. These narrow linear polyethylene standards may be obtained from Polymer Laboratories (Shropshire, UK; Part No.'s PL2650-0101 and PL2650-0102). The systematic approach for the determination of multi-detector offsets is performed in a manner consistent with that published by Balke, Mourey, et al. (Mourey and Balke, *Chromatography Polym.*, Chapter 12, (1992)) (Balke, Thitiratsakul, Lew, Cheung, Mourey, *Chromatography Polym.*, Chapter 13, (1992)), optimizing triple detector log($M_W$ and intrinsic viscosity) results from Dow 1683 broad polystyrene (American Polymer Standards Corp.; Mentor, Ohio) or its equivalent to the narrow standard column calibration results from the narrow polystyrene standards calibration curve. The molecular weight data, accounting for detector volume off-set determination, are obtained in a manner consistent with that published by Zimm (Zimm, B. H., J. Chem. Phys., 16, 1099 (1948)) and Kratochvil (Kratochvil, P., *Classical Light Scattering from Polymer Solutions*, Elsevier, Oxford, N.Y. (1987)). The overall injected concentration used in the determination of the molecular weight is obtained from the mass detector area and the mass detector constant derived from a suitable linear polyethylene homopolymer, or one of the polyethylene standards. The calculated molecular weights are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

g' by 3D-GPC

The index (g') for the sample polymer is determined by first calibrating the light scattering, viscosity, and concentration detectors described in the Gel Permeation Chromatography method supra with SRM 1475a homopolymer polyethylene (or an equivalent reference). The light scattering and viscometer detector offsets are determined relative to the concentration detector as described in the calibration. Baselines are subtracted from the light scattering, viscometer, and concentration chromatograms and integration windows are then set making certain to integrate all of the low molecular weight retention volume range in the light scattering and viscometer chromatograms that indicate the presence of detectable polymer from the refractive index chromatogram. A linear homopolymer polyethylene is used to establish a Mark-Houwink (MH) linear reference line by injecting a broad molecular weight polyethylene reference such as SRM1475a standard, calculating the data file, and recording the intrinsic viscosity (IV) and molecular weight ($M_W$), each derived from the light scattering and viscosity detectors respectively and the concentration as determined from the RI detector mass constant for each chromatographic slice. For the analysis of samples the procedure for each chromatographic slice is repeated to obtain a sample Mark-Houwink line. Note that for some samples the lower molecular weights, the intrinsic viscosity and the molecular weight data may need to be extrapolated such that the measured molecular weight and intrinsic viscosity asymptotically approach a linear homopolymer GPC calibration curve. To this end, many highly-branched ethylene-based polymer samples require that the linear reference line be shifted slightly to account for the contribution of short chain branching before proceeding with the long chain branching index (g') calculation.

A g-prime ($g_i'$) is calculated for each branched sample chromatographic slice (i) and measuring molecular weight ($M_i$) according to Equation 2, where the calculation utilizes the $IV_{linear\ reference,j}$ at equivalent molecular weight, $M_j$, in the linear reference sample. In other words, the sample IV slice (i) and reference IV slice (j) have the same molecular weight ($M_i = M_j$). For simplicity, the $IV_{linear\ reference,j}$ slices are calculated from a fifth-order polynomial fit of the reference Mark-Houwink Plot. The IV ratio, or $g_i'$, is only obtained at molecular weights greater than 3,500 because of signal-to-noise limitations in the light scattering data. The number of branches along the sample polymer ($B_n$) at each data slice (i) can be determined by using Equation 3, assuming a viscosity shielding epsilon factor of 0.75.

Finally, the average LCBf quantity per 1000 carbons in the polymer across all of the slices (i) can be determined using Equation 4.

gpcBR Branching Index by 3D-GPC

In the 3D-GPC configuration the polyethylene and polystyrene standards can be used to measure the Mark-Houwink constants, K and α, independently for each of the two polymer types, polystyrene and polyethylene. These can be used to refine the Williams and Ward polyethylene equivalent molecular weights in application of the following methods.

The gpcBR branching index is determined by first calibrating the light scattering, viscosity, and concentration detectors as described previously. Baselines are then subtracted from the light scattering, viscometer, and concentration chromatograms. Integration windows are then set to ensure integration of all of the low molecular weight retention volume range in the light scattering and viscometer chromatograms that indicate the presence of detectable polymer from the refractive index chromatogram. Linear polyethylene standards are then used to establish polyethylene and polystyrene Mark-Houwink constants as described previously. Upon obtaining the constants, the two values are used to construct two linear reference conventional calibrations ("cc") for polyethylene molecular weight and polyethylene intrinsic viscosity as a function of elution volume, as shown in Equations 5 and 6, respectively.

The gpcBR branching index is a robust method for the characterization of long chain branching. See Yau, Wallace W., "Examples of Using 3D-GPC—TREF for Polyolefin Characterization", *Macromol. Symp.*, 2007, 257, 29-45. The index avoids the slice-by-slice 3D-GPC calculations traditionally used in the determination of g' values and branching frequency calculations in favor of whole polymer detector areas and area dot products. From 3D-GPC data, one can obtain the sample bulk $M_w$ by the light scattering (LS) detector using the peak area method. The method avoids the slice-by-slice ratio of light scattering detector signal over the concentration detector signal as required in the g' determination.

The area calculation in Equation 7, offers more precision because as an overall sample area it is much less sensitive to variation caused by detector noise and GPC settings on baseline and integration limits. More importantly, the peak area calculation is not affected by the detector volume offsets. Similarly, the high-precision sample intrinsic viscosity (IV) is obtained by the area method shown in Equation 8, where $DP_i$ stands for the differential pressure signal monitored directly from the online viscometer.

To determine the gpcBR branching index, the light scattering elution area for the sample polymer is used to determine the molecular weight of the sample. The viscosity detector elution area for the sample polymer is used to determine the intrinsic viscosity (IV or [η]) of the sample.

Initially, the molecular weight and intrinsic viscosity for a linear polyethylene standard sample, such as SRM1475a or an equivalent, are determined using the conventional calibrations for both molecular weight and intrinsic viscosity as a function of elution volume, per Equations 9 and 10.

Equation 11, is used to determine the gpcBR branching index, where [η] is the measured intrinsic viscosity, $[\eta]_{cc}$ is the intrinsic viscosity from the conventional calibration, $M_w$ is the measured weight average molecular weight, and $M_{w,cc}$ is the weight average molecular weight of the conventional calibration. The Mw by light scattering (LS) using Equation 7 is commonly referred to as the absolute Mw; while the Mw,cc from Equation 9 using the conventional GPC molecular weight calibration curve is often referred to as polymer chain Mw. All statistical values with the "cc" subscript are determined using their respective elution volumes, the corresponding conventional calibration as previously described, and the concentration ($C_i$) derived from the mass detector response. The non-subscripted values are measured values based on the mass detector, LALLS, and viscometer areas. The value of $K_{PE}$ is adjusted iteratively until the linear reference sample has a gpcBR measured value of zero. For example, the final values for α and Log K for the determination of gpcBR in this particular case are 0.725 and −3.355, respectively, for polyethylene, and 0.722 and −3.993 for polystyrene, respectively.

Once the K and α values have been determined, the procedure is repeated using the branched samples. The branched samples are analyzed using the final Mark-Houwink constants as the best "cc" calibration values and applying Equations 7-11.

The interpretation of gpcBR is straight forward. For linear polymers, gpcBR calculated from Equation 11 will be close to zero since the values measured by LS and viscometry will be close to the conventional calibration standard. For branched polymers, gpcBR will be higher than zero, especially with high levels of LCB, because the measured polymer $M_w$ will be higher than the calculated $M_{w,cc}$, and the calculated $IV_{cc}$ will be higher than the measured polymer Intrinsic Viscosity (IV). In fact, the gpcBR value represents the fractional IV change due the molecular size contraction effect as the result of polymer branching. A gpcBR value of 0.5 or 2.0 would mean a molecular size contraction effect of IV at the level of 50% and 200%, respectively, versus a linear polymer molecule of equivalent weight.

For these particular Examples, the advantage of using gpcBR in comparison to the g' index and branching frequency calculations is due to the higher precision of gpcBR. All of the parameters used in the gpcBR index determination are obtained with good precision and are not detrimentally affected by the low 3D-GPC detector response at high molecular weight from the concentration detector. Errors in detector volume alignment also do not affect the precision of the gpcBR index determination. In other particular cases, other methods for determining $M_W$ moments may be preferable to the aforementioned technique.

CEF Method

Comonomer distribution analysis is performed with Crystallization Elution Fractionation (CEF) (PolymerChar in Spain) (B Monrabal et al, Macromol. Symp. 257, 71-79 (2007)). Ortho-dichlorobenzene (ODCB) with 600 ppm antioxidant butylated hydroxytoluene (BHT) is used as solvent. Sample preparation is done with autosampler at 160° C. for 2 hours under shaking at 4 mg/ml (unless otherwise specified). The injection volume is 300 μl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

CEF column is packed by the Dow Chemical Company with glass beads at 125 μm±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml) and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in equation 12 where the column resolution is 6.0.

CDC Method

Comonomer distribution constant (CDC) is calculated from comonomer distribution profile by CEF. CDC is defined as Comonomer Distribution Index divided by Comonomer Distribution Shape Factor multiplying by 100 as shown in Equation 13.

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated from comonomer distribution profile by CEF, and CDC is defined as Comonomer Distribution Index divided by Comonomer Distribution Shape Factor multiplying by 100 as shown in Equation 13 and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp).

CDC is calculated according to the following steps:

(A) Obtain a weight fraction at each temperature (T) ($w_T$(T)) from 35.0° C. to 119.0° C. with a temperature step increase of 0.200° C. from CEF according to Equation 14;

(B) Calculate the median temperature ($T_{median}$) at cumulative weight fraction of 0.500, according to Equation 15;

(C) Calculate the corresponding median comonomer content in mole % ($C_{median}$) at the median temperature ($T_{median}$) by using comonomer content calibration curve according to Equation 16;

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC)

at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content; The calibration is calculated from each reference material as shown in Formula 16 wherein: $R^2$ is the correlation constant;

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95;

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak; and (H) Calculate the standard deviation of temperature (Stdev) according Equation 17.

Creep Zero Shear Viscosity Method

Zero-shear viscosities are obtained via creep tests that are conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 µm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the order of $10^{-3}$ s$^{-1}$ for the samples in this study. Steady state is determined by taking a linear regression for all the data in the last 10% time window of the plot of log(J(t)) vs. log(t), where J(t) is creep compliance and t is creep time. If the slope of the linear regression is greater than 0.97, steady state is considered to be reached, then the creep test is stopped. In all cases in this study the slope meets the criterion within 30 minutes. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio

Zero-shear viscosity ratio (ZSVR) is defined as the ratio of the zero-shear viscosity (ZSV) of the inventive polymer to the ZSV of a linear polyethylene material at the equivalent weight average molecular weight ($M_{w-gpc}$) as shown in the Equation 18.

The $\eta_0$ value (in Pa·s) is obtained from creep test at 190° C. via the method described above. It is known that ZSV of linear polyethylene $\eta_{0L}$ has a power law dependence on its $M_w$ when the $M_w$ is above the critical molecular weight $M_c$. An example of such a relationship is described in Karjala et al. (Annual Technical Conference—Society of Plastics Engineers (2008), $66^{th}$, 887-891) as shown in the Equation 19 to calculate the ZSVR values. Referring to Equation 19 $M_{w-gpc}$ value (g/mol) is determined by using the GPC method as defined immediately hereinbelow.

$M_{w-gpc}$ Determination

To obtain $M_{w-gpc}$ values, the chromatographic system consist of either a Polymer Laboratories Model PL-210 or a Polymer Laboratories Model PL-220. The column and carousel compartments are operated at 140° C. Three Polymer Laboratories 10-µm Mixed-B columns are used with a solvent of 1,2,4-trichlorobenzene. The samples are prepared at a concentration of 0.1 g of polymer in 50 mL of solvent. The solvent used to prepare the samples contain 200 ppm of the antioxidant butylated hydroxytoluene (BHT). Samples were prepared by agitating lightly for 4 hours at 160° C. The injection volume used is 100 microliters and the flow rate is 1.0 mL/min. Calibration of the GPC column set is performed with twenty one narrow molecular weight distribution polystyrene standards purchased from Polymer Laboratories. The polystyrene standard peak molecular weights are converted to polyethylene molecular weights using Equation 20.

Referring to Equation 20 M is the molecular weight, A has a value of 0.4316 and B is equal to 1.0. A third order polynomial is determined to build the logarithmic molecular weight calibration as a function of elution volume. Polyethylene equivalent molecular weight calculations are performed using Viscotek TriSEC software Version 3.0. The precision of the weight-average molecular weight $\Delta M_w$ is excellent at <2.6%.

$^1$H NMR Method 3.26 g of stock solution is added to 0.133 g of polyolefin sample in 10 mm NMR tube. The stock solution is a mixture of tetrachloroethane-d$_2$ (TCE) and perchloroethylene (50:50, w:w) with 0.001M Cr$^{3+}$. The solution in the tube is purged with N$_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double presaturation experiments.

For the control experiment, the data is processed with exponential window function with LB=1 Hz, baseline was corrected from 7 to −2 ppm. The signal from residual $^1$H of TCE is set to 100, the integral $I_{total}$ from −0.5 to 3 ppm is used as the signal from whole polymer in the control experiment. The number of CH$_2$ group, NCH$_2$, in the polymer is calculated as following:

$NCH_2 = I_{total}/2$

For the double presaturation experiment, the data is processed with exponential window function with LB=1 Hz, baseline was corrected from 6.6 to 4.5 ppm. The signal from residual $_1$H of TCE is set to 100, the corresponding integrals for unsaturations ($I_{vinylene}$, $I_{trisubstituted}$, $I_{vinyl}$ and $I_{vinylidene}$) were integrated based on the region shown in FIG. 1. The number of unsaturation unit for vinylene, trisubstituted, vinyl and vinylidene are calculated:

$$N_{vinylene} = I_{vinylene}/2$$

$$N_{trisubstituted} = I_{trisubstitute}$$

$$N_{vinyl} = I_{vinyl}/2$$

$$N_{vinylidene} = I_{vinylidene}/2$$

The unsaturation unit/1,000,000 carbons is calculated as following:

$$N_{vinylene}/1,000,000\ C = (N_{vinylene}/NCH_2)*1,000,000$$

$$N_{trisubstituted}/1,000,000\ C = (N_{trisubstituted}/NCH_2)*1,000,000$$

$$N_{vinyl}/1,000,000\ C = (N_{vinyl}/NCH_2)*1,000,000$$

$$N_{vinylidene}/1,000,000\ C = (N_{vinylidene}/NCH_2)*1,000,000$$

The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1$H signal from residual proton from TCT-d2. The control is run with ZG pulse, TD 32768, NS 4, DS 12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64 s, D1 1 s, D13 13 s. The modified pulse sequences for unsaturation with Bruker AVANCE.

Hot Tack

Hot tack measurements on the film are performed using an Enepay commercial testing machines according to ASTM F-1921 (Method B). Prior to testing the samples are conditioned for a minimum of 40 hrs at 23° C. and 50% R.H. per ASTM D-618 (Procedure A). The hot tack test simulates the filling of material into a pouch or bag before the seal has had a chance to cool completely.

Sheets of dimensions 8.5" by 14" are cut from the film, with the longest dimension in the machine direction. Strips 1" wide and 14" long are cut from the film [samples need only be of sufficient length for clamping]. Tests are performed on these samples over a range of temperatures and the results reported as the maximum load as a function of temperature. Typical temperature steps are 5° C. or 10° C. with 6 replicates performed at each temperature. The parameters used in the test are as follows:

Specimen Width: 25.4 mm (1.0 in)
Sealing Pressure: 0.275 N/mm$^2$
Sealing Dwell Time: 0.5 s
Delay time: 0.1 s
Peel speed: 200 mm/s The Enepay machines make 0.5 inch seals. The data are reported as a hot tack curve where Average Hot Tack Force (N) is plotted as a function of Temperature, as for example shown in FIG. 23. The Hot Tack Initiation temperature is the temperature required to achieve a pre-defined Minimum Hot Tack Force. This force is typically in the 1-2N range, but will vary depending on the specific application. The ultimate Hot Tack Strength is the peak in the hot tack curve. The Hot Tack Range is the range in temperature at which the seal strength exceeds the Minimum Hot Tack Force.

Heat Seal

Heat Seal measurements on the film are performed on a commercial tensile testing machine according to ASTM F-88 (Technique A). The Heat Seal test is a gauge of the strength of seals (Seal Strength) in flexible barrier materials. It does this by measuring the force required to separate a test strip of material containing the seal and identifies the mode of specimen failure. Seal Strength is relevant to the opening force and package integrity.

Prior to cutting, the films are conditioned for a minimum of 40 hrs at 23° C. (±2° C.) and 50% (±5%) R.H. per ASTM D-618 (procedure A). Sheets are then cut from the film in the machine direction to a length of approximately 11 inches and a width of approximately 8.5 inches. The sheets are heat sealed across the machine direction on a Kopp Heat Sealer over a range of temperatures under the following conditions:

Sealing Pressure: 0.275 N/mm$^2$
Sealing Dwell Time: 0.5 s

The temperature range is approximately given by the Hot Tack Range (i.e. the temperature range over which at least a minimum hot tack seal is achieved and prior to the burn-through temperature).

The sealed sheets are conditioned for a minimum of 3 hours at 23° (±2° C.) and 50% R.H (±5%) prior to cutting into one inch wide strips. These strips are then further conditioned for a minimum of 24 hours at 23° (±2° C.) and 50% R.H (±5%) prior to testing.

For testing, the strips are loaded into the grips of a tensile testing machine at an initial separation of 2 inches mm and pulled at a grip separation rate of 10 inches/min at 23° (±2° C.) and 50% R.H (±5%). The strips are tested unsupported. Six replicate tests are performed for each sealing temperature.

The data are reported as the maximum force at failure, the average peel force (as shown in FIG. 3), and the failure mode.

The present invention may be embodied in other forms without departing from the spirit and the essential attributes thereof, and, accordingly, reference should be made to the appended claims, rather than to the foregoing specification, as indicating the scope of the invention.

We claim:

1. A sealant composition comprising:
 (a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein ethylene/α-olefin interpolymer has a Comonomer Distribution Constant (CDC) in the range of from 15 to 250, a density in the range of from 0.875 to 0.963 g/cm$^3$, a melt index ($I_2$) in a range of from 0.2 to 20 g/10 minutes, and long chain branching frequency in the range of from 0.02 to 3 long chain branches (LCB) per 1000 C; and
 (b) from 0.5 to 30 percent by weight of a propylene/α-olefin interpolymer composition, based on the total weight of the sealant composition, wherein said propylene/α-olefin interpolymer composition comprises a propylene/α-olefin copolymer or a propylene/ethylene/butene terpolymer, wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.

2. A method for producing a sealant composition comprising the steps of
selecting an ethylene/α-olefin interpolymer composition, based on the total weight of the sealant composition, wherein said ethylene/α-olefin interpolymer composition comprises an ethylene/α-olefin interpolymer, wherein ethylene/α-olefin interpolymer has a Comonomer Distribution Constant (CDC) in the range of from 15 to 250, and a density in the range of from 0.875 to 0.963 g/cm$^3$, a melt index (I$_2$) in a range of from 0.2 to 20 g/10 minutes, and long chain branching frequency in the range of from 0.02 to 3 long chain branches (LCB) per 1000 C; and
selecting a propylene/α-olefin interpolymer composition, wherein said propylene/α-olefin interpolymer composition comprises a propylene/α-olefin copolymer or a propylene/ethylene/butene terpolymer, wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.;
blending said ethylene/α-olefin interpolymer composition and said propylene/α-olefin interpolymer composition;
thereby forming a sealant composition comprising from 70 to 99.5 percent by weight of said ethylene/α-olefin interpolymer composition and from 0.5 to 30 percent by weight of said propylene/α-olefin interpolymer composition.

3. A sealing layer comprising a sealant composition comprising:
(a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein ethylene/α-olefin interpolymer has a Comonomer Distribution Constant (CDC) in the range of from 15 to 250, and a density in the range of from 0.875 to 0.963 g/cm$^3$, a melt index (I$_2$) in a range of from 0.2 to 20 g/10 minutes, and long chain branching frequency in the range of from 0.02 to 3 long chain branches (LCB) per 1000 C; and
(b) from 0.5 to 30 percent by weight of a propylene/α-olefin interpolymer composition, wherein said propylene/α-olefin interpolymer composition comprises a propylene/α-olefin copolymer or a propylene/ethylene/butene terpolymer, wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.

4. An article comprising:
at least one sealing layer comprising a sealant composition comprising;
(a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein ethylene/α-olefin interpolymer has a Comonomer Distribution Constant (CDC) in the range of from 15 to 250, and a density in the range of from 0.875 to 0.963 g/cm$^3$, a melt index (I$_2$) in a range of from 0.2 to 20 g/10 minutes, and long chain branching frequency in the range of from 0.02 to 3 long chain branches (LCB) per 1000 C; and
(b) from 0.5 to 30 percent by weight of a propylene/α-olefin interpolymer composition, wherein said propylene/α-olefin interpolymer composition comprises a propylene/α-olefin copolymer or a propylene/ethylene/butene terpolymer, wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.; and
at least one substrate layer.

5. A method for forming an article comprising the steps of:
selecting a sealant composition comprising:
(a) from 70 to 99.5 percent by weight of an ethylene/α-olefin interpolymer composition, based on the total weight of the sealant composition, wherein said ethylene/α-olefin interpolymer composition comprises an ethylene/α-olefin interpolymer, wherein ethylene/α-olefin interpolymer has a Comonomer Distribution Constant (CDC) in the range of from 15 to 250, and a density in the range of from 0.875 to 0.963 g/cm$^3$, a melt index (I$_2$) in a range of from 0.2 to 20 g/10 minutes, and long chain branching frequency in the range of from 0.02 to 3 long chain branches (LCB) per 1000 C; and
(b) from 0.5 to 30 percent by weight of a propylene/α-olefin interpolymer composition, wherein said propylene/α-olefin interpolymer composition comprises a propylene/α-olefin copolymer or a propylene/ethylene/butene terpolymer, wherein said propylene/α-olefin copolymer has a crystallinity in the range of from 1 percent by weight to 30 percent by weight, a heat of fusion in the range of from 2 Joules/gram to 50 Joules/gram, and a DSC melting point in the range of 25° C. to 110° C.;
selecting at least one substrate layer;
applying said sealant composition to at least one surface of said at least one substrate layer;
thereby forming at least one sealant layer associated with at least one surface of said at least one substrate layer.

6. The composition according to claim 1, wherein said ethylene/α-olefin interpolymer comprises less than 120 total unsaturation units/1,000,000 C.

7. The composition according to claim 1, wherein said sealant composition has a heat seal strength measured in lb of force in a three-layer film structure of equal or greater than $[((0.7053(T))-(47.521)]$, wherein T is sealing temperature in the range of 68 to 74° C., wherein heat seal strength is measured via W Kopp heat seal instrument at a temperature in the range of from 68° C. to 74° C.

8. The composition according to claim 1, wherein said sealant composition has a heat seal strength measured in lb of force in a three-layer film structure of equal or greater than $[((0.6322)(T))-(41.0429)]$, wherein T is sealing temperature in the range of 65 to 72° C., wherein heat seal strength is measured via W Kopp heat seal instrument at a temperature in the range of from 65° C. to 72° C.

9. The composition according to claim 1, wherein said sealant composition has a hot tack force strength (N of force) in a three-layer film structure of equal or greater than $[((-4.1540)(10^{-6})(T^4))+((1.2797)(10^{-3})(T^3))-((1.4144)(10^{-1})(T^2))+((6.7463)(T))-117.390]$, wherein T is the temperature of the hot tack test in ° C. in the rage of from 50 to 105° C., wherein hot tack is measured via Enepay hot tack instrument at a temperature in the range of from 50 to 105° C.

10. The composition according to claim 1, wherein said ethylene/α-olefin interpolymer has a zero shear viscosity ratio (ZSVR) in the range of from greater than 2.1 to 7.0.

11. The composition according to claim 1, wherein said ethylene/α-olefin interpolymer has trisubstitute unsaturation in the range of from less than 20 units/1,000,000 C.

12. The composition according to claim 1, wherein said ethylene/α-olefin interpolymer has vinylene unsaturation in the range of from less than 20 units/1,000,000 C.

13. The composition according to claim 1, wherein said ethylene/α-olefin interpolymer has a molecular weight distribution ($M_w/M_n$) in the range of from 2.0 to 5.0.

14. The composition according to claim 1, wherein said ethylene/α-olefin interpolymer has a melt flow ratio ($I_{10}/I_2$) in the range of from 5 to 15.

15. The composition according to claim 1, wherein said ethylene/α-olefin interpolymer has a crystallinity in the range of from less than 80 percent measured via DSC.

* * * * *